(12) United States Patent
Sun et al.

(10) Patent No.: US 11,724,616 B2
(45) Date of Patent: *Aug. 15, 2023

(54) METHODS AND SYSTEMS FOR FACILITATING CHARGING SESSIONS FOR ELECTRIC VEHICLES, WITH IMPROVED USER INTERFACE OPERATION MODES

(71) Applicant: NAD Grid Corp, Cupertino, CA (US)

(72) Inventors: Thomas Shaofeng Sun, Cupertino, CA (US); Timotej Gavrilovic, Cupertino, CA (US); Thai Vinh Loc Nguyen, Cupertino, CA (US)

(73) Assignee: NAD Grid Corp, Cupertino, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/163,638

(22) Filed: Feb. 1, 2021

(65) Prior Publication Data
US 2021/0213846 A1 Jul. 15, 2021

Related U.S. Application Data

(63) Continuation-in-part of application No. 16/983,175, filed on Aug. 3, 2020, now Pat. No. 10,981,464, which is a continuation-in-part of application No. 16/843,874, filed on Apr. 8, 2020, now Pat. No. 10,953,765, which is a continuation-in-part of
(Continued)

(51) Int. Cl.
*H02J 7/00* (2006.01)
*H02J 7/14* (2006.01)
*B60L 53/62* (2019.01)
*B60L 53/63* (2019.01)
*G06Q 50/06* (2012.01)
*B60L 53/66* (2019.01)
(Continued)

(52) U.S. Cl.
CPC ............ *B60L 53/62* (2019.02); *B60L 53/63* (2019.02); *B60L 53/665* (2019.02); *B60L 58/12* (2019.02); *G06Q 20/18* (2013.01); *G06Q 50/06* (2013.01)

(58) Field of Classification Search
CPC ........ B60L 53/62; B60L 53/12; B60L 53/665; B60L 53/63
USPC ........................................................ 320/132
See application file for complete search history.

(56) References Cited

U.S. PATENT DOCUMENTS 10,814,741 B2 10/2020 Homma et al.
2011/0246252 A1 10/2011 Uesugi
(Continued)

*Primary Examiner* — Alexis B Pacheco
(74) *Attorney, Agent, or Firm* — Ivan J. Wong

(57) ABSTRACT

Embodiments of a method and/or system for charging one or more electric vehicles (e.g., based on one or more reserved charging sessions; for charging an electric vehicle during a scheduled time period; etc.) can include: receiving a reservation request (e.g., a reservation request including one or more reservation parameters; etc.); scheduling a reserved charging session based on the reservation request (e.g., based on reservation parameters from the reservation request; etc.); determining a check in at an Electric Vehicle Service Equipment (EVSE) for the reserved charging session; and/or causing the EVSE to charge the electric vehicle based on the reserved charging session (e.g., during the scheduled time period; etc.). Embodiments can support load management across groups of vehicles, offline access control, and improved user interfaces with improved security for facilitating charging sessions.

21 Claims, 21 Drawing Sheets

Related U.S. Application Data application No. 16/741,712, filed on Jan. 13, 2020, now Pat. No. 10,836,274.

(60) Provisional application No. 63/126,447, filed on Dec. 16, 2020, provisional application No. 63/048,577, filed on Jul. 6, 2020.

(51) Int. Cl.
*G06Q 20/18* (2012.01)
*B60L 58/12* (2019.01)

(56) References Cited

U.S. PATENT DOCUMENTS

| | | |
|---|---|---|
| 2013/0110296 A1 | 5/2013 | Khoo et al. |
| 2013/0310999 A1 | 11/2013 | Baxter et al. |
| 2014/0184170 A1 | 7/2014 | Jeong |
| 2014/0336965 A1 | 11/2014 | Mori et al. |
| 2015/0239362 A1 | 8/2015 | Mizuno |
| 2016/0159239 A1 | 6/2016 | Shi et al. |
| 2017/0276503 A1 | 9/2017 | Oh et al. |
| 2018/0062839 A1 | 3/2018 | Biswas |
| 2019/0139107 A1 | 5/2019 | Khoo et al. |
| 2019/0139161 A1 | 5/2019 | Sakuma et al. |
| 2019/0143828 A1 | 5/2019 | Sawada et al. |
| 2019/0143833 A1 | 5/2019 | Shen et al. |
| 2019/0311630 A1 | 10/2019 | VanderZanden et al. |
| 2019/0351775 A1 | 11/2019 | Jang et al. |
| 2019/0386502 A1 | 12/2019 | Penilla et al. |
| 2020/0055419 A1 | 2/2020 | Kim et al. |
| 2020/0070672 A1 | 3/2020 | Vahedi et al. |
| 2021/0213848 A1* | 7/2021 | Sun ........................ B60L 53/305 |

* cited by examiner

Example Load Control Slider Element of User Interface:

LOAD CONTROL (kW)
Adjust to balance ongoing electricity load for the EVSEs at this site

0                               34 kW (max)

Example Load Control Scheduling Elements of User Interface:

SCHEDULE LOAD ADJUSTMENT
Adjust to balance electricity load for the EVSEs at this site during specified window DATE AND TIME
After specified time, electric load will return to default

DATE               START TIME             END TIME

LOAD CONTROL (kW)

0                               34 kW (max)

DEFAULT LOAD (kW)

0                               34 kW (max)

FIG. 6B

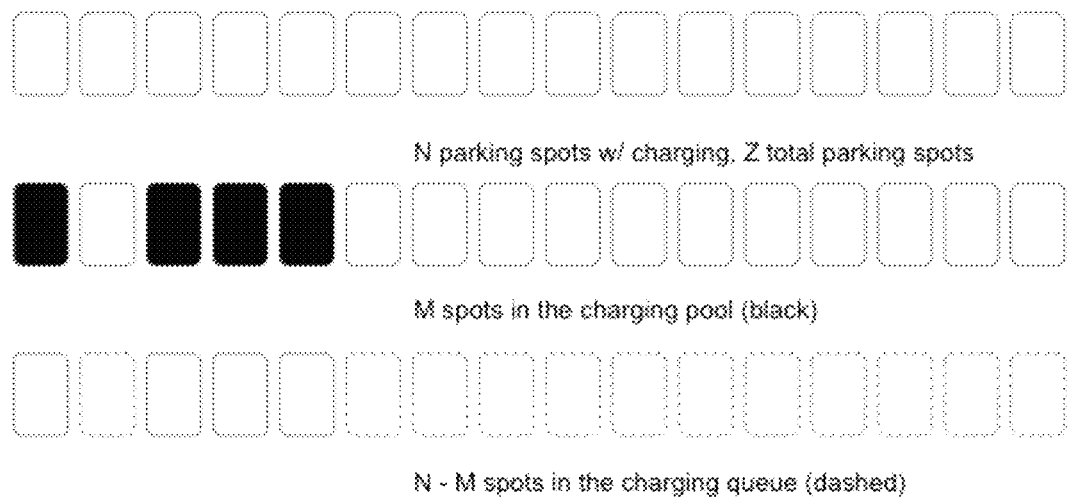

FIG. 6E

```
detecting or receiving information pertaining to the state(s) of
charge (SOC) of vehicles interfacing with the set of EVSEs  S371
```
↓
```
maintaining battery health and improving battery life for each of a
set of vehicles interfacing with the set of EVSEs by setting the
state(s) of charge of the set of vehicles to a desired level (e.g., x%
charge) and/or at a desired rate of charge, and charging one or
more of the set of vehicles to the desired level/at the desired rate
S372
```

FIG. 6F retrieving, for each electric vehicle of a group of electric vehicles in association with respective charging sessions: an arrival SOC, an arrival time, a needed departure SOC, an actual departure SOC, and a departure time  S91

categorize individual electric vehicles of the group of electric vehicles as belonging to different subgroups with different charging needs upon determining a charging power needed by each vehicle in relation to a dwell time for each vehicle S92

coordinate distribution of the group of electric vehicles across a set of EVSEs based upon at least one of power output capabilities of the set of EVSEs and availability of each of the set of EVSEs S93

FIG. 9A

METHODS AND SYSTEMS FOR FACILITATING CHARGING SESSIONS FOR ELECTRIC VEHICLES, WITH IMPROVED USER INTERFACE OPERATION MODES

CROSS-REFERENCE TO RELATED APPLICATIONS

This application is a continuation-in-part of U.S. patent application Ser. No. 16/983,175 filed on Aug. 3, 2020, which is a continuation-in-part of U.S. patent application Ser. No. 16/843,874 filed on Apr. 8, 2020, which is a continuation-in-part of U.S. patent application Ser. No. 16/741,712, filed on Jan. 13, 2020, each of which is incorporated in its entirety herein by this reference.

This application also claims the benefit of U.S. Provisional Application No. 63/048,577, filed on Jul. 6, 2020 and U.S. Provisional Application No. 63/162,447 filed on Dec. 16, 2020, each of which is incorporated in its entirety herein by this reference.

TECHNICAL FIELD

The disclosure generally relates to charging of electric vehicles.

BRIEF DESCRIPTION OF THE FIGURES

FIGS. 6A-6F include variations of load management applications, flow charts, and schematics in relation to an embodiment of a method.

FIGS. 9A-9B depict variations of a portion of a method for load optimization in meeting charging needs of a group of electric vehicles.

DESCRIPTION OF THE EMBODIMENTS

The following description of the embodiments (e.g., including variations of embodiments, examples of embodiments, specific examples of embodiments, other suitable variants, etc.) is not intended to be limited to these embodiments, but rather to enable any person skilled in the art to make and use.

1. Overview

Figure 1:
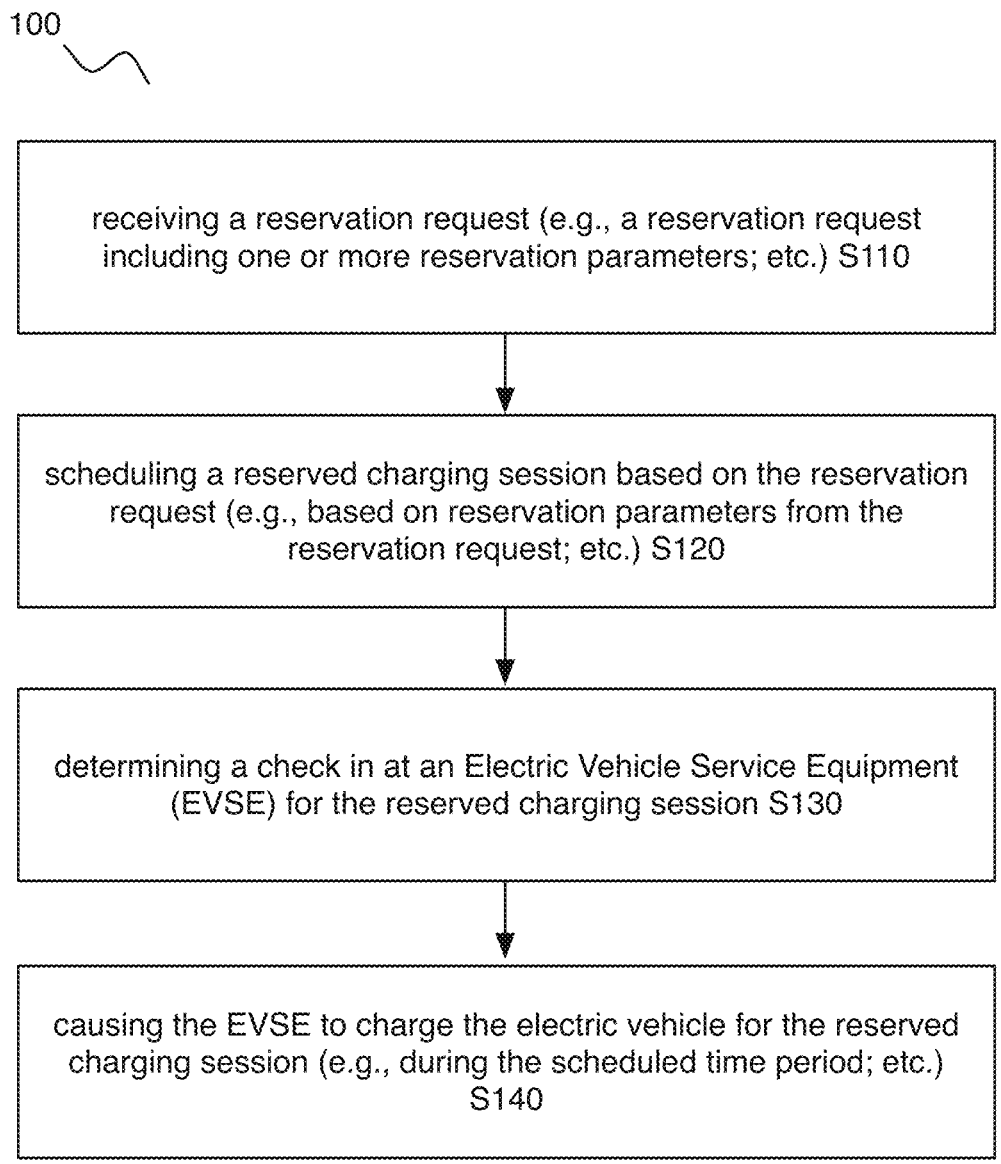
FIG. 1 includes a flowchart representation of variations of an embodiment of a method.
Figure 2:
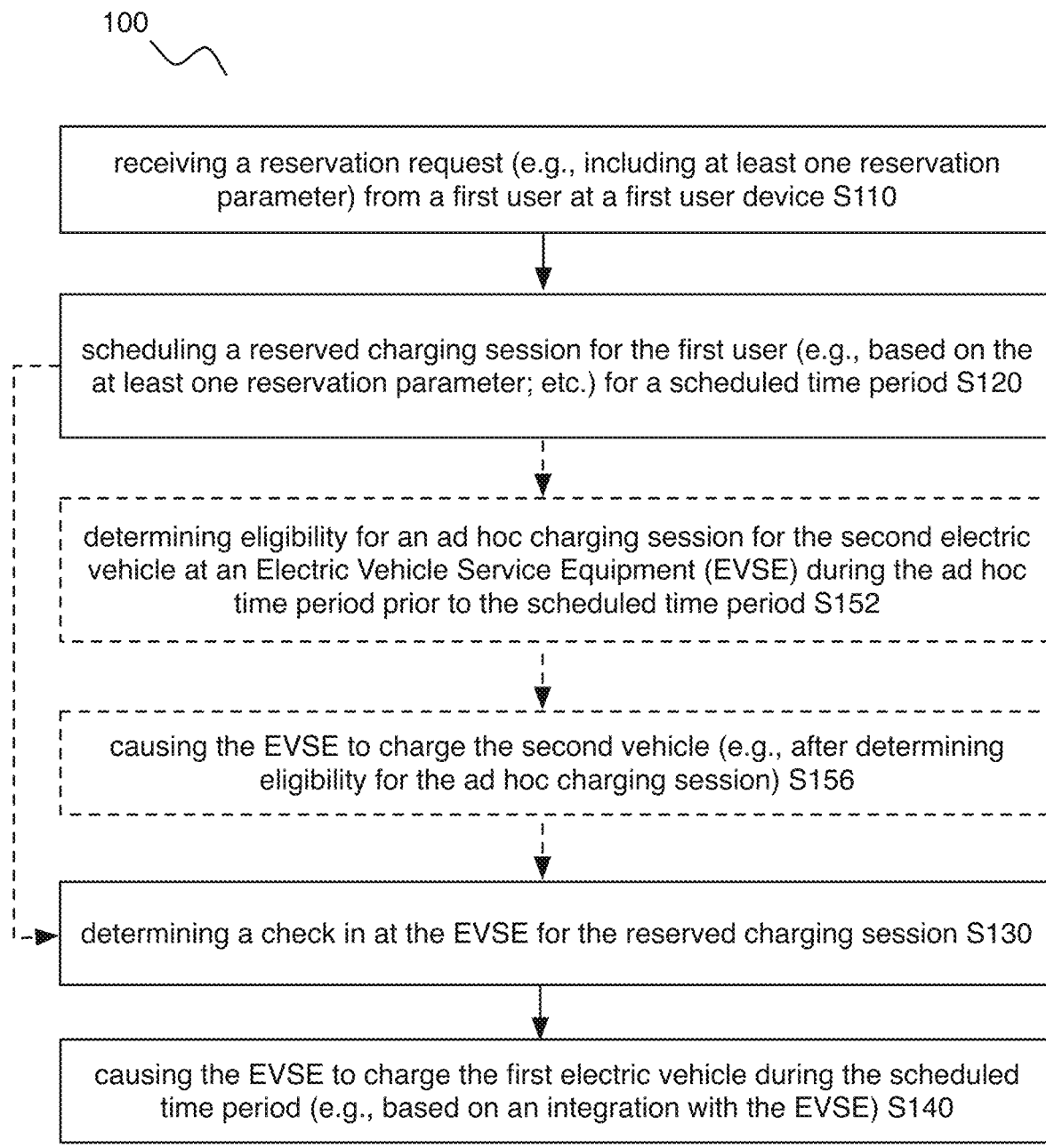
FIG. 2 includes a flowchart representation of variations of an embodiment of a method.
Figure 3:
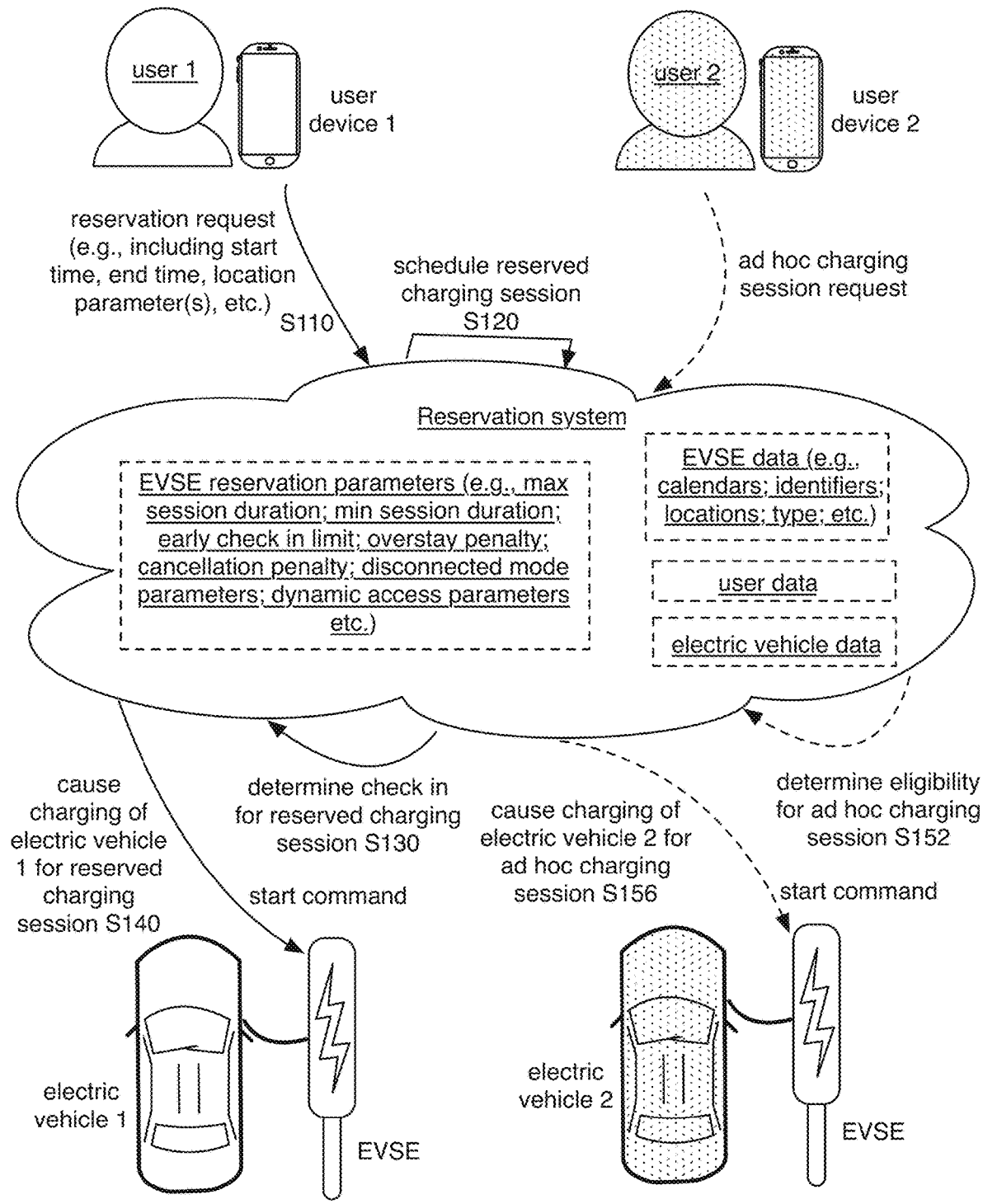
FIG. 3 includes a flowchart representation of variations of an embodiment of a method.

As shown in FIGS. 1-3, embodiments of a method 100 for charging one or more electric vehicles (e.g., based on one or more reserved charging sessions; for charging an electric vehicle during a scheduled time period; etc.) can include: receiving a reservation request (e.g., a reservation request including one or more reservation parameters; etc.) S110; scheduling a reserved charging session based on the reservation request (e.g., based on reservation parameters from the reservation request; etc.) S120; determining a check in at an Electric Vehicle Service Equipment (EVSE) for the reserved charging session S130; and/or causing the EVSE to charge the electric vehicle for the reserved charging session (e.g., during the scheduled time period; etc.) S140.

Additionally or alternatively, embodiments of a method 100 can include: facilitating an ad hoc charging session S150; providing a user interface S160; and/or providing notifications S170. However, embodiments of the method 100 can include any suitable processes for facilitating charging of one or more electric vehicles.

Embodiments of the invention(s) described can function to improve user experience with charging electric vehicles by improving interoperability, reliability (e.g., where reservations can guarantee charging sessions at one or more EVSEs, etc.), and/or better utilization of public infrastructure. However, embodiments can include any suitable functionality.

In examples, the system and/or method can confer at least several improvements over conventional approaches. Specific examples of the method 100, 300 and/or system 200 can confer technologically-rooted solutions to issues associated with charging electric vehicles.

In specific examples, the method 100 and/or system 200, and variations and extensions thereof, can improve low interoperability between different charging networks each requiring a different mode of access to receive charging (e.g., requiring an electric vehicle user to install and use multiple applications, RFID cards, etc.). In specific examples, the method 100, 300 and/or system 200 can improve low utilization of deployed EVSEs, such as where low utilization can be caused by gas cars parked at EVSEs, deployment of an EVSE at a low-traffic location, avoidance of public charging by users due to difficulty of access and/or unpredictable availability, and/or other suitable causes. In specific examples, the method 100, 300 and/or system 200 can improve unpredictability associated with a first come first serve model for using EVSEs, where such unpredictability can lead to long wait times or having to extensively search for an open EVSE.

In specific examples, the methods 100, 300, 400 and/or system 200 can improve various areas associated with electric vehicle charging, including one or more of: shared workplace charging, shared home charging in multi-unit dwellings, shared public place charging (e.g., for faster chargers with charging session limits; for lifestyle charging where charging sessions can be completed in a manner that complements a user's lifestyle and/or schedule; etc.); road trip planning; towing (e.g., for towing a stranded electric vehicle to an EVSE that can be reserved before arrival; etc.); fleets and/or ridesharing electric vehicles (e.g., delivery fleets, transport fleets, and/or ridesharing electric vehicles that can reserve one or more EVSEs; for avoiding downtime; etc.); V1G unidirectional charging (e.g., enabling users to reserve certain EVSEs during event hours to curtail load; reserving and/or throttling L2 EVSEs into L1 EVSEs during event hours to curtail load; etc.); Vehicle to Grid (V2G) charging (e.g., enabling bi-directional EVSEs that can supply electricity back to the grid to also service electric vehicles in normal conditions; enabling reservations for vehicles able to respond to demand response events via one or more bi-directional EVSEs; etc.); autonomous electric vehicles (e.g., which can be configured to make reservations for one or more scheduled charging sessions; which can be aided by human individuals who can plug in the EVSE for the autonomous electric vehicle; etc.); and/or any other suitable areas.

In specific examples, the technology can transform entities (e.g., EVSEs, electric vehicles; etc.) into different states or things. In specific examples, the method 100, 300 and/or system 200 can cause one or more EVSEs to charge one or more electric vehicles, such as for one or more reserved charging sessions and/or ad hoc charging sessions. In specific examples, the method 100, 300 and/or system 200 can facilitate the charging of an electric vehicle from a partially charged state or empty state to a fully charged or to a more fully charged state.

Additionally or alternatively, data described herein (e.g., reservation requests; reservation parameters, EVSE reservation parameters; EVSE identifiers; other EVSE data; user identifiers; vehicle identifiers; other identifiers; user interface data; user data; electric vehicle data; reserved charging session-related data; ad hoc charging session-related data; etc.) can be associated with any suitable temporal indicators (e.g., seconds, minutes, hours, days, weeks, time periods, time points, timestamps, etc.) including one or more: temporal indicators indicating when the data was collected, determined, transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores, confidence levels, identifiers, values along a spectrum, and/or any other suitable types of values. Any suitable types of data described herein can be used as inputs (e.g., for different models described herein, such as scheduling models for scheduling one or more reserved charging sessions and/or in relation to one or more ad hoc charging sessions; etc.), generated as outputs (e.g., of models), and/or manipulated in any suitable manner for any suitable components associated with the method 100, 300 and/or system 200.

One or more instances and/or portions of the method 100 and/or processes described herein can be performed asynchronously (e.g., sequentially), concurrently (e.g., performing scheduling for a plurality of reserved charging sessions and/or ad hoc charging sessions for a plurality of EVSEs across a plurality of locations, for a plurality of users and associated electric vehicles; performing processes of the method 100 concurrently on different threads for parallel computing to improve system processing ability for facilitating reserved charging sessions and/or ad hoc charging sessions; etc.), in temporal relation to a trigger event (e.g., performance of a portion of an embodiment of the method 100), and/or in any other suitable order at any suitable time and frequency by and/or using one or more instances of the system 200, components, and/or entities described herein.

Embodiments of the system 200 can include a reservation system (e.g., for scheduling and/or implementing one or more reserved charging sessions and/or ad hoc charging sessions; for maintaining reservation calendars for EVSEs; for communicating with one or more EVSEs to cause charging of one or more electric vehicles; a centralized reservation system; etc.); an application (e.g., a mobile application for a mobile user device; an application including a user interface, such as for receiving inputs from a user and/or for providing information to a user; etc.); and/or other suitable components. In variations, the system 200 can include one or more EVSEs, electric vehicles, and/or any other suitable components. Components of embodiments of the system 200 can include any suitable distribution of functionality across the components.

The system 200 and/or portions of the system 200 can entirely or partially be executed by, hosted on, communicate with, and/or otherwise include: a remote computing system (e.g., a server, at least one networked computing system, stateless, stateful; etc.), a local computing system, user devices, electric vehicles, EVSEs and/or other suitable charger equipment, mobile phone device, other mobile devices, personal computing device, tablet, wearable devices, databases, application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 200 can be physically and/or logically integrated in any manner (e.g., with any suitable distributions of functionality across the components, such as in relation to portions of the method 100; etc.). In specific examples, any suitable components of embodiments of the system 200 can perform any suitable portions of embodiments of the method 100 and/or 300. However, the method 100, 300 and/or system 200 can be configured in any suitable manner.

1.1 Reserved and Ad Hoc Charging Sessions

In a specific example, as shown in FIGS. 2-3, the method 100 (e.g., for charging a first electric vehicle during a scheduled time period and/or for charging a second electric vehicle during an ad hoc time period; etc.) can include: receiving a reservation request from a first user at a first user device (e.g., at a mobile application for the first user device; etc.), such as where the first user is associated with the first electric vehicle, and such as where the reservation request includes at least one reservation parameter indicative of the scheduled time period; scheduling a reserved charging session for the first user based on the at least one reservation parameter; determining eligibility for an ad hoc charging session for the second electric vehicle at an Electric Vehicle Service Equipment (EVSE) during the ad hoc time period prior to the scheduled time period (e.g., based on a comparison between the ad hoc time period and the scheduled time period; etc.); causing the EVSE to charge the second vehicle based on an integration with the EVSE (e.g., after determining eligibility for the ad hoc charging session; after determining that the user is eligible for the ad hoc charging session; etc.); determining a check in at the EVSE for the reserved charging session (e.g., after the ad hoc charging session for the second electric vehicle; etc.); and/or causing the EVSE to charge the first electric vehicle during the scheduled time period based on the integration with the EVSE (e.g., in response to determining the check in of the first electric vehicle at the EVSE, etc.).

Figure 4:
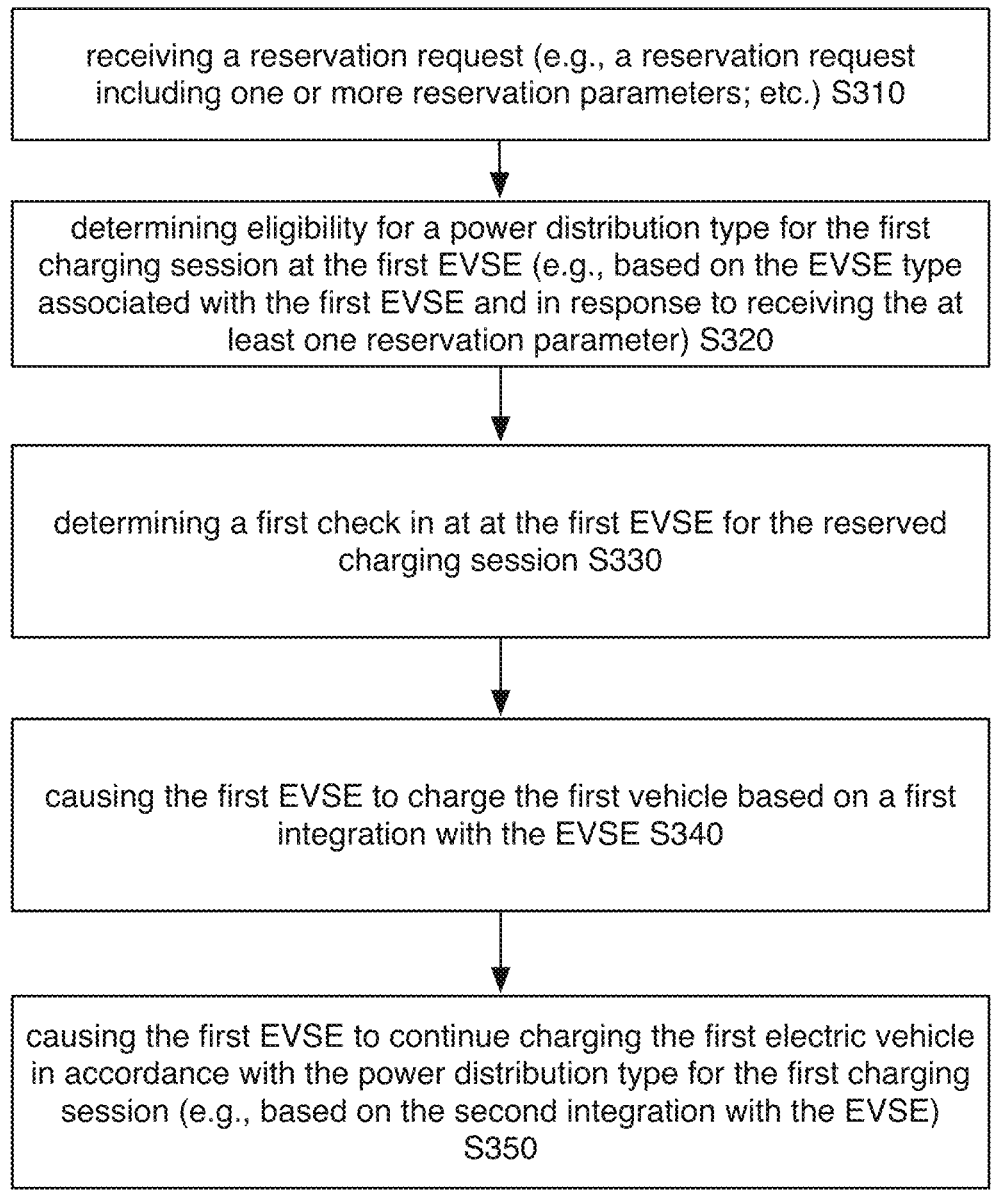
FIG. 4 includes a flowchart representation of variations of an embodiment of a method.
Figure 5:
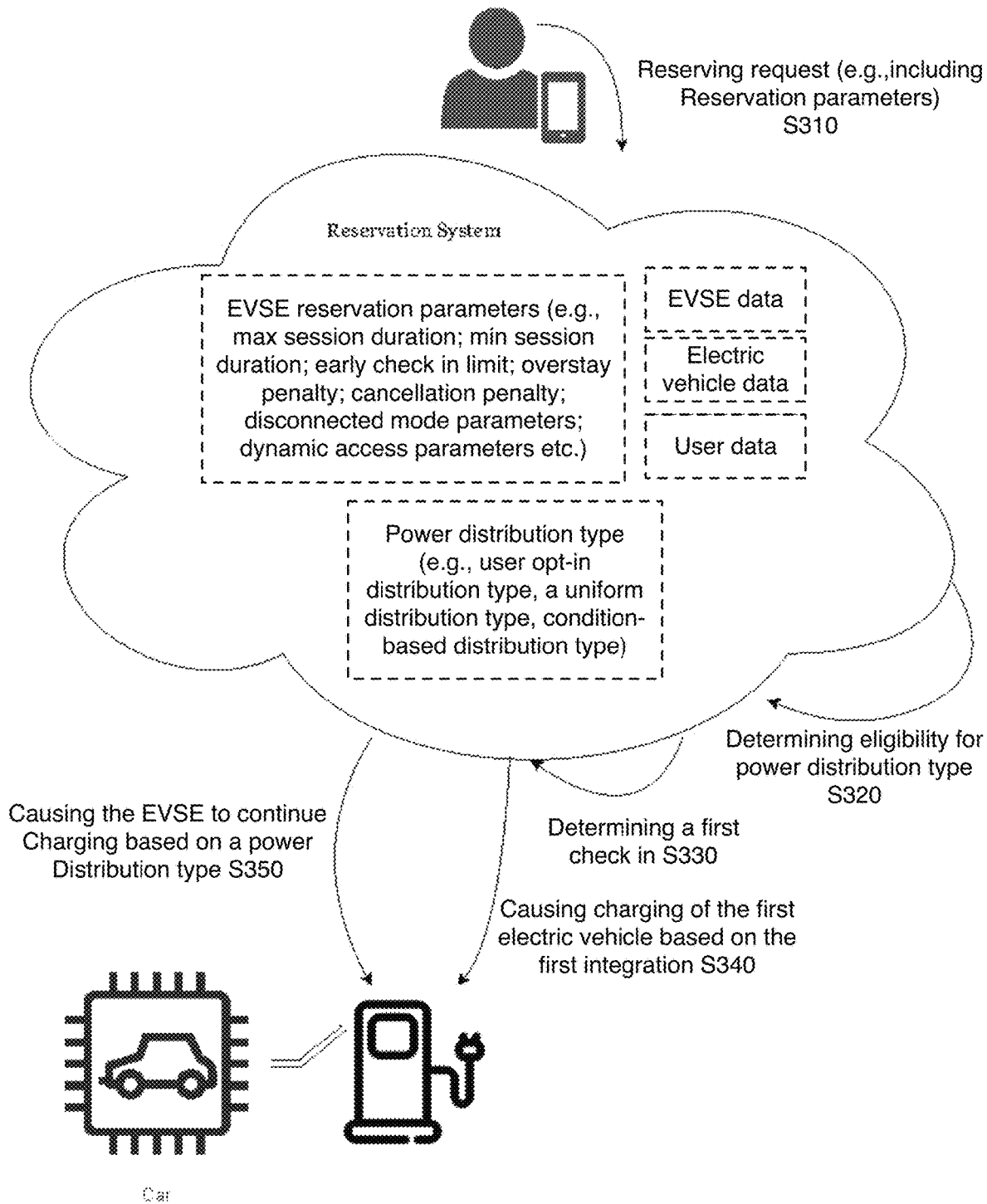
FIG. 5 includes a flowchart representation of variations of an embodiment of a method.

As shown in FIG. 4-5, embodiments of a method 300 (e.g., for charging an electric vehicle for a charging session, etc.) can include: receiving a reservation request from a first user at a first user device for a first charging session, wherein the first user is associated with the first electric vehicle, and wherein the reservation request comprises at least one reservation parameter indicative of the charging session for the first electric vehicle S310; determining eligibility for a power distribution type for the first charging session at the first ESVE (e.g., in response to receiving the at least one reservation parameter, etc.) S320; determining a first check in at the first EVSE for the first charging session S330; causing the first EVSE to charge the first electric vehicle based on a first integration with the EVSE S340; causing the first EVSE to continue charging the first electric vehicle in accordance with the power distribution type for the first charging session (e.g., after determining the first check in at the first EVSE for the first charging session, etc.), based on a second integration with the EVSE S350.

1.2 Load Management, Distribution, and Sharing

Figure 6A:
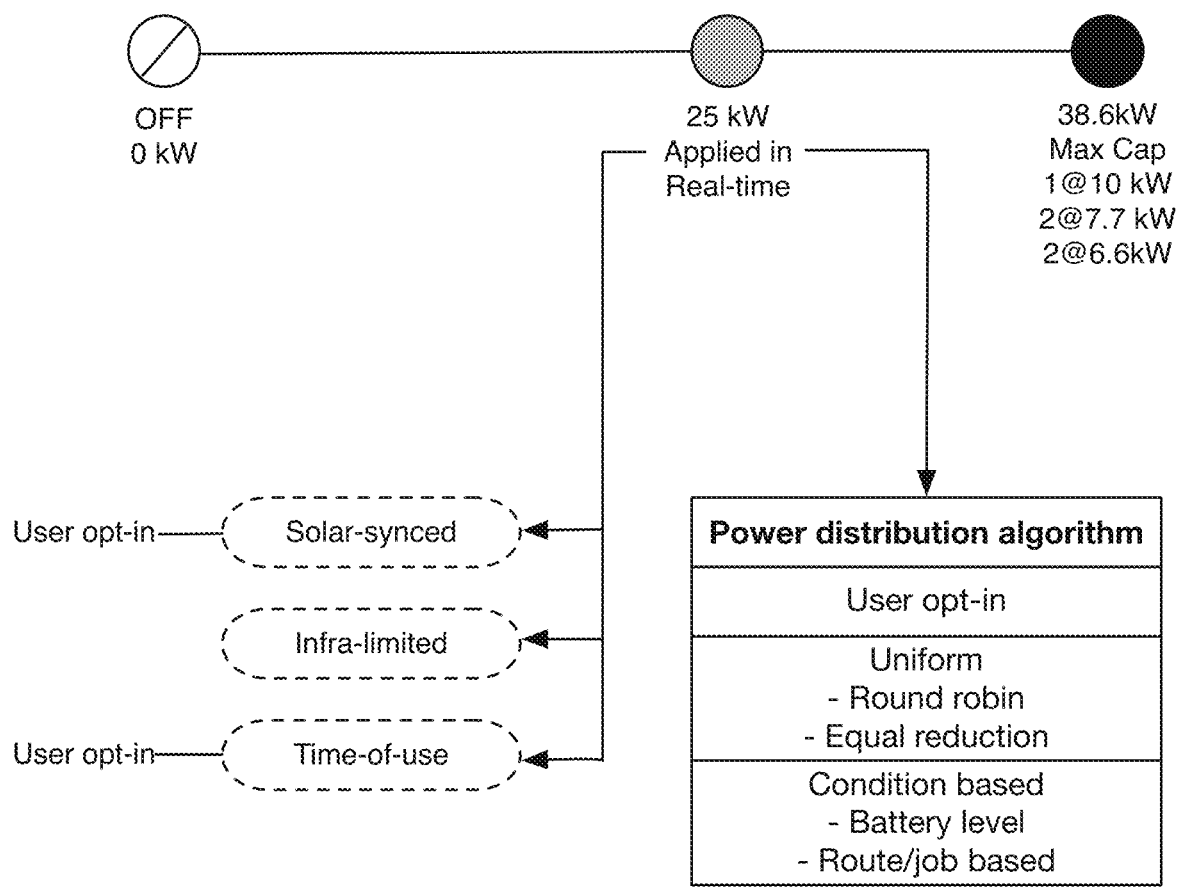

In specific examples, as shown in FIGS. 6A-6F, the method 300 can include directly controlling load management and distribution for one or more EVSEs (e.g., via OCPP and/or other suitable protocols, such as protocols described herein, etc.), where controlling load management can include causing power throttling between 0 and the max capacity for the one or more EVSEs. In more detail, the method 300 can include programmatically controlling each EVSE, with detection of load on each EVSE, in relation to a maximum (e.g., maximum specified) load aggregated from the maximum load each EVSE can deliver. The method 300 can then allow a controller (e.g., controller functionality of a system executing an application for EVSE control) to execute instructions for adjusting the electricity load delivered for each of the EVSEs (e.g., in real time), for instance, as shown in FIG. 6B (top).

In one variation of adjusting load delivery, the delivery output of each EVSE can be adjusted (e.g., throttled, increased, etc.) simultaneously (e.g., to the same percentage, to the same delivery rate, to provide the same total energy delivered, etc.). In one example, the system can determine a percentage by which delivery is throttled, based upon a ratio between an input constraint and a summation of the maximum load each EVSE can deliver (e.g., a collective maximum power output). For instance, the input constraint (e.g., 7 kW output) can be determined using a controller (e.g., controller functionality of an application for managing distribution across a set of EVSEs), and for a set of EVSEs having a collective maximum power output (e.g., of 34 kW), the throttling percent can be determined as: input constraint/ collective maximum power output=7 kW/34 kW 20%. In a related example, for a first EVSE having a first power output rating (e.g., 7 kW) and a second EVSE having a second power output rating (e.g., 10 kW), the throttling percent can be determined as: input constraint/collective maximum power output=7 kW/(7 kW+10 kW)~41%.

In related examples, the adjusted throttling amount can change in real time based upon traffic, based upon how many chargers are in use, and/or based upon other suitable factors. For instance, in the example above, for a first vehicle charging at the first EVSE and a second vehicle charging at the second EVSE, the first car will receive 7 kW*41% throttling amount=2.8 kW, and the second car will receive 10 kW*41% throttling amount=4.1 kW. Then, if the first vehicle terminates charging at the first EVSE but the second vehicle continues charging at the second EVSE, the second vehicle will receive 7 kW due to the input constraint of 7 kW.

Figure 6C:
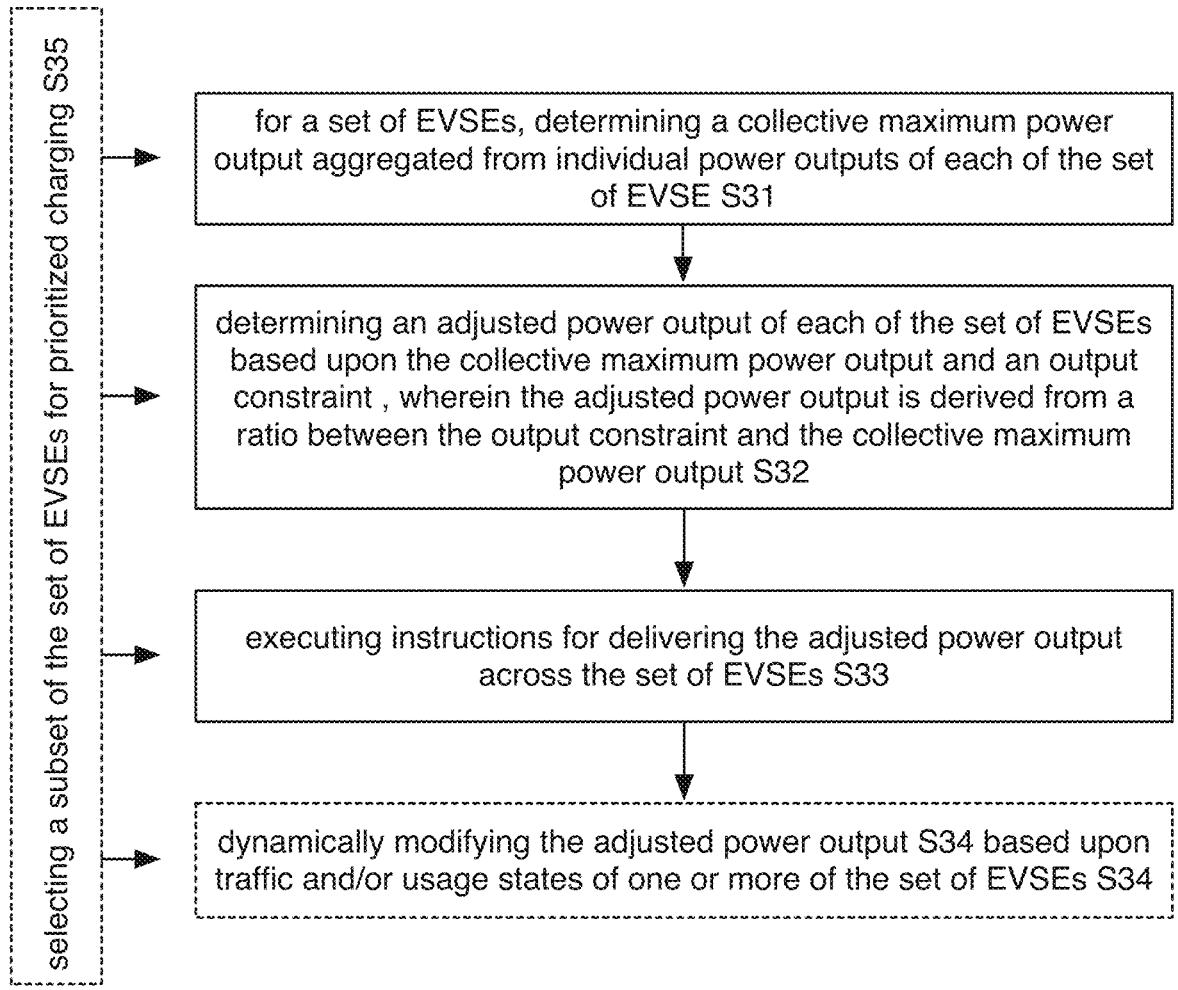

As such, as shown in FIG. 6C, the method 300 can include: for a set of EVSEs, determining a collective maximum power output aggregated from individual power outputs of each of the set of EVSE S31; determining an adjusted power output of each of the set of EVSEs based upon the collective maximum power output and an output constraint (e.g., an output constraint determined by an operator, a pre-determined output constraint, an output constraint determined based upon other factors described throughout this disclosure, etc.), wherein the adjusted power output is derived from a ratio between the output constraint and the collective maximum power output S32; and executing instructions for delivering the adjusted power output across the set of EVSEs S33 (e.g., in response to or in coordination with a set of reserved, ad hoc, and/or spontaneous charging sessions associated with the set of EVSEs). Executing instructions in relation to step S33 can include generating control instructions associated with implementation of the adjusted power output parameters across the set of EVSEs (or a subset of the EVSEs), where the control instructions can be stored in non-transitory media. Then, the system can execute the control instructions to perform one or more steps of the method 300.

In variations, the output constraint can be a limiting power output (e.g., a power output value less than or equal to the collective maximum power output), and the adjusted power output can be throttled by a percent determined from the ratio between the output constraint and the collective maximum power output. In variations, the method 300 can include dynamically modifying the adjusted power output S34 based upon traffic and/or usage states of one or more of the set of EVSEs (e.g., modifying the adjusted power output in response to at least one of increased occupancy of the set of EVSEs and decreased occupancy of the set of EVSEs). For instance, the adjusted power output can be re-determined upon initiation and/or termination of charging by a vehicle of a set of vehicles interacting with the set of EVSEs. In particular, the adjusted power output can be determined based upon the ratio: output constraint/sum(maximum delivery load$_i$), where i is an index for each EVSE undergoing a charging session.

In these variations, the EVSEs can be identical in terms of specified maximum power output and/or other characteristics, or can alternatively be non-identical in characteristics.

In a variation of the method 300 for condition-based power distribution, shown in FIG. 6C, the method 300 can include selecting a subset of the set of EVSEs for prioritized charging S35, and executing instructions for prioritizing charging of a set of vehicles through the subset of EVSEs, based upon a set of conditions S36. Selecting the subset of EVSEs for prioritized charging can be based upon distribution characteristics of the EVSEs (e.g., in relation to DC fast charging capability, in relation to other charging capabilities), location characteristics of the EVSEs (e.g., identification of geographic location characteristics of the EVSEs, in relation to remoteness, in relation to proximity to commercial areas, in relation to proximity to rural areas, in relation to proximity to residential areas, etc.), usage data for the EVSEs (e.g., prioritizing charging through heavily used EVSEs, in order to improve traffic flow, prioritizing charging through less-heavily-used EVSEs, in order to equalize maintenance requirements across the set of EVSEs), EVSE state characteristics (e.g., prioritizing charging through properly-operating EVSEs, etc.), EVSE connectivity states (e.g., prioritizing charging through EVSEs that are connected to a cloud-based platform, etc.), and/or other suitable characteristics. In variations where charging through a subset of EVSEs is prioritized, the method 300 can include stopping (e.g., temporarily stopping) charging through a non-prioritized subset of EVSEs, throttling charging through the non-prioritized subset of EVSEs (e.g., reducing load delivered through the non-prioritized subset of EVSEs relative to the prioritized subset of EVSEs), or otherwise postponing charging through the non-prioritized subset of EVSEs in another suitable manner.

Additionally or alternatively, variations of step S35 for condition-based power distribution can include selecting a subset of the set of EVSEs for prioritized charging based upon characteristics of the vehicles and/or users of vehicles intended to be charged. In one variation, users belonging to a particular user group can be prioritized, and, upon verification of such users, EVSEs selected for charging the vehicle(s) of the user(s) can be configured for prioritized. As such, the method 300 can include: at an EVSE, verifying an identify of a vehicle and/or user of a vehicle of a particular user group S36, and upon verification of the identity, configuring the EVSE (e.g., remotely configuring the EVSE, upon generation of control instructions for the EVSE) for prioritized charging of the vehicle at the EVSE S37. The particular group can be characterized by a common business entity (e.g., in relation to business affiliation, in relation to employment, in relation to business promotion, in relation to customer/vendor relationship, etc.), by a vehicle fleet, by an organization membership, by association with civil service operations (e.g., law enforcement operations, fire department operations, etc.), by association with healthcare/first response services (e.g., in relation to ambulance operations, etc.), by delivery entity or operation (e.g., in relation to package delivery services), or by another suitable grouping.

As such, in a specific example, as shown by FIG. 8, users can be grouped into different access groups (e.g. user groups; groups such as staff, faculty, fleet, student, public, and/or other suitable groups, such as a group associated with a set of electric vehicles) for dynamic access control. Codes (e.g., data sequence uniquely identifying an access group, access codes, authentication codes, etc.) can be generated for different user groups where such codes can be shared across the set of vehicles. The codes can be refreshed (e.g., on a periodic interval, such as daily, etc.). The codes can then be associated with an access parameter placed on a user group. The access parameter can include a pricing parameter specifying a pricing category (e.g., no charge, employee/fleet rate, student rate, public rate, etc.) for the access group, and/or a dedicated time slot parameter assigning dedicated charging access to different time slots. However, user groups can be configured in any suitable manner.

Additionally or alternatively, in relation to step S35, the subset of the set of EVSEs for prioritized charging can be selected based upon characteristics or states of the vehicles. Example characteristics can include vehicle charge state (e.g., state of charge below a threshold level of charge), vehicle state in relation to a mission (e.g., based upon an analysis of suitable charge state relative to an intended mission determined through a GPS route of the vehicle or destination of the vehicle determined in another manner), vehicle failure state, or other suitable vehicle state. As such, the method 300 can include: at an EVSE, verifying a status (e.g., charge status, mission status, etc.) of a vehicle and/or user of a vehicle of a particular user group S38, and upon verification of the status, configuring the EVSE (e.g., remotely configuring the EVSE, upon generation of control instructions for the EVSE) for prioritized charging of the vehicle at the EVSE S37.

In relation to load management and distribution across a set of EVSEs, the system can enable implementation of scheduled load management controls, such that operating managers of the set of EVSEs can schedule various adjusted power output settings for one or more of the EVSEs. Scheduling of adjusted power output settings can be based upon selection of particular time windows, based upon future events (e.g., triggering events, anticipating events), or based upon other factors. Scheduling functionality (e.g., of an application for managing EVSE operation) can be provided as part of a premium package/subscription or standard package/subscription. In one example, as shown in FIG. 6B (bottom), the system can receive an input from a managing operator (e.g., through a mobile application, through a web application, through another application), where the input indicates a default load distribution cap. The system can additionally receive an input from the managing operator indicating future events (e.g., through a calendar tool, as described below) and associate power output adjustment settings (e.g., between 8 AM and 10 AM PT on Dec. 25, 2020, throttle load for a subset of EVSEs to 50%). In this example, power output settings for the EVSEs involved would the receive instructions to transition from the default load distribution cap when entering the time window for output throttling. and transition to the default load distribution when leaving the scheduled time window for output throttling.

Figure 6D:
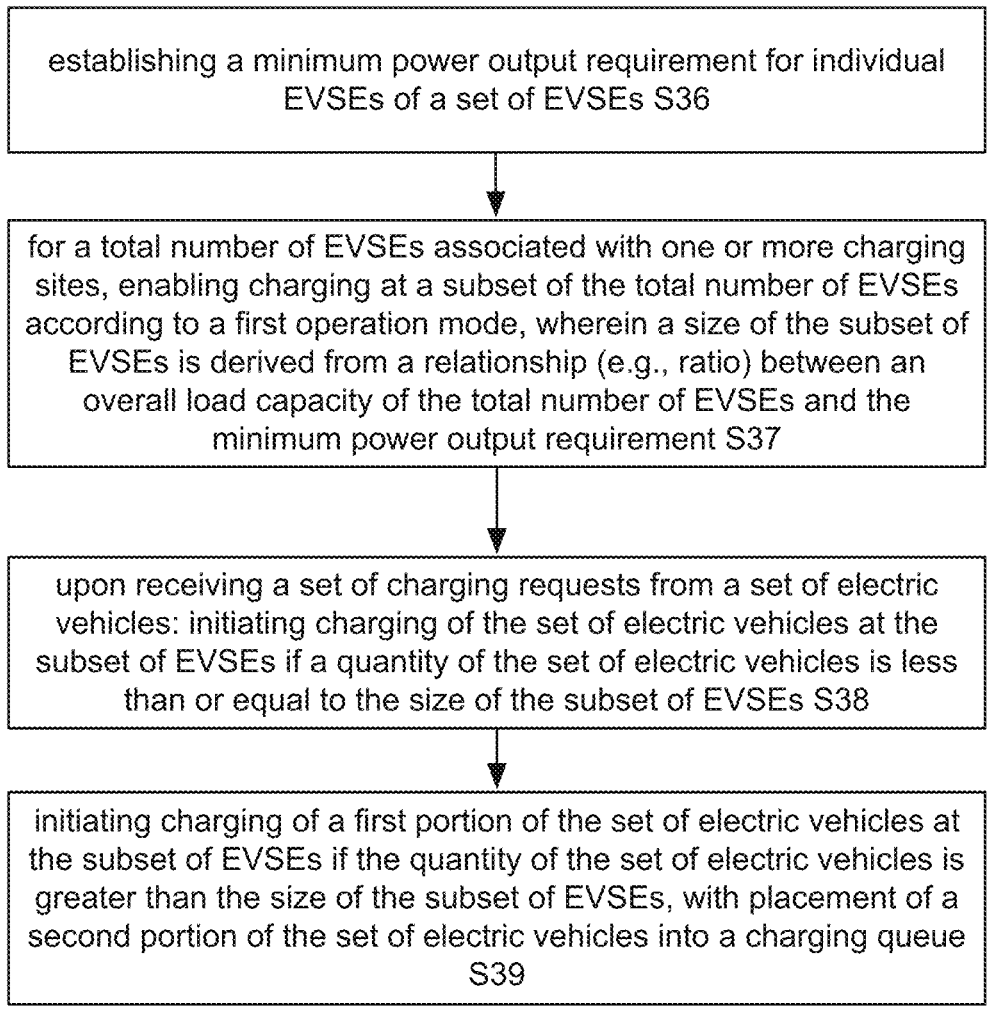

In another example, as shown in FIGS. 6D and 6E, the method 300 can include steps for and implement system architecture for controlling load sharing and distribution across electric vehicles at a site (or set of sites) hosting a set of EVSEs, such that the output of each of the set of EVSEs never falls below a minimum output value (e.g., associated with a minimum charging rate). In more detail, with respect to a set of EVSEs (e.g., N total EVSEs), the system architecture can define a subset (e.g., M EVSEs) of the set of N EVSEs that are available for a first mode of charge distribution, and a second subset (e.g., N-M EVSEs) that are available in a charging queue (e.g., for a second mode of charge distribution). In embodiments, such a configuration for load sharing/distribution can provide improved load distribution and load sharing modes with respect to output power capabilities of the set of EVSEs. For instance, the methods described can be configured to avoid situations in which the set of EVSEs are subject to demand outside of the range of power they are capable (e.g., individually, collectively) able to provide. In one example use case, the methods described can mitigate situations in which the number of vehicles needing charging would collectively create demand that is outside the range(s) of output (e.g., in terms of current, in terms of voltage) that the set of EVSEs can provide. Furthermore, such a configuration can provide an improved user experience, by avoiding scenarios in which users wait within a queue for extensive or unnecessary amounts of time in order to charge their vehicle(s).

In a variation of the first operation mode, the M EVSEs can be configured to distribute an equal share of the available charging capacity to the electrical vehicles in communication with the M EVSEs, while additional users/electric vehicles are placed into the charging queue until a position becomes available amongst the M EVSEs (e.g., when an electric vehicle fully charges or leaves one of the M EVSEs). In this variation, the number M of the total N EVSEs can be determined by setting a minimum power output per EVSE/charging spot of the subset of M EVSEs, such that the power output is always above the lowest acceptable output of the range(s) of output each EVSE can provide. In an example, the minimum power output k can be set greater than a minimum output value (e.g., $k \geq 1$ kW), such that M is derived from the overall output capacity of the set of EVSEs divided by k (e.g., M=floor(C(overall load capacity)/k)). Additionally or alternatively, the number M of the total N EVSEs can be determined by setting M as any number as long as $M \leq N$ and $C/M \geq$ the minimum power output k.

In another variation of the first operation mode, each of the M EVSEs can be configured to distribute a non-equal share of the available charging capacity to the electrical vehicles in communication with the M EVSEs, as long as the power output from each of the subset of M EVSEs does not fall below a minimum power output (k) requirement. For instance, one or more of: traffic at the site associated with the set of EVSEs, non-uniform output capabilities of individual EVSEs of the set of EVSEs being used, non-uniform charging needs of vehicles interacting with the set of EVSEs (e.g., for different vehicles at different states of charge), or other factors.

As such, as shown in FIG. 6D, the method 300 can include steps for: establishing a minimum power output requirement for individual EVSEs of a set of EVSEs S36; for a total number of EVSEs associated with one or more charging sites, enabling charging at a subset of the total number of EVSEs according to a first operation mode, wherein a size of the subset of EVSEs is derived from a relationship (e.g., ratio) between an overall load capacity of the total number of EVSEs and the minimum power output requirement S37; upon receiving a set of charging requests from a set of electric vehicles: initiating charging of the set of electric vehicles at the subset of EVSEs if a quantity of the set of electric vehicles is less than or equal to the size of the subset of EVSEs S38; and initiating charging of a first portion of the set of electric vehicles at the subset of EVSEs if the quantity of the set of electric vehicles is greater than the size of the subset of EVSEs, with placement of a second portion of the set of electric vehicles into a charging queue S39.

As described above, in the first operation mode, the subset of EVSEs can be configured to distribute an equal share of the available charging capacity/overall load capacity of the set of EVSEs to the electrical vehicles in communication with the EVSEs, while additional users/electric vehicles are placed into the charging queue until a position becomes available amongst the subset of EVSEs (e.g., when an electric vehicle fully charges or leaves one of the subset EVSEs). However, as described above and further below, in the first operation mode, the subset of EVSEs may alternatively be configured to distribute a non-equal share of the operation mode, the subset of EVSEs can be configured to distribute an equal share of the available charging capacity/ overall load capacity of the set of EVSEs (e.g., as long as individual EVSEs output greater than the minimum power output requirement).

Furthermore, as described above, the relationship can be derived from the overall load output capacity of the set of EVSEs divided by the minimum power output requirement k (e.g., M=floor(C(overall load capacity)/k)). Additionally or alternatively, the relationship can be determined by setting the size of the subset as any number as long as the size of the subset of EVSEs is less than or equal to the total number of EVSEs, and the overall load output capacity divided by the size of the subset is greater than or equal to the minimum power output (k). However, the relationship for determining an appropriate size of the subset of EVSEs can be defined in another suitable manner.

FIG. 6E depicts a set of N total EVSEs, with M EVSE sites in a charging pool according to a first operation mode, and N-M EVSE sites in a second operation mode (e.g., as a charging queue). In this configuration, once vehicles at the M EVSE sites achieve a desired state of charge and/or leave the M EVSE sites, one or more EVSEs associated with the charging queue can be configured to transition to the first operation mode for charging an associated vehicle (i.e., thus removing the EVSE/vehicle from the charging queue). Furthermore, an EVSE previously in the charging pool that has completed charging of a vehicle can be transitioned to the second mode of operation (e.g., ready to accept a vehicle into the charging queue).

In variations, as shown in FIG. 6F, the method 300 can implement system architecture for prioritized load sharing based upon on vehicle need. For instance, in applications associated with load sharing based on vehicle need, the method 300 can include one or more of: detecting or receiving information pertaining to the state(s) of charge (SOC) of vehicles interfacing with the set of EVSEs S371 through vehicle integration or vehicle-to-grid communication interfaces (e.g., such as interfaces associated with ISO 15118 or another standard); and maintaining battery health and improving battery life for each of a set of vehicles interfacing with the set of EVSEs by setting the state(s) of charge of the set of vehicles to a desired level (e.g., x % charge) and/or at a desired rate of charge, and charging one or more of the set of vehicles to the desired level/at the desired rate S372. In one such variation, the need per vehicle (n) is thus x %-SOC, and the method 300 can include providing instructions for governing load sharing across the set of EVSEs by providing each of a set of M vehicles with charging parameters corresponding to $n_i/\text{sum}(n_1, \ldots n_M)$.

Applications of load sharing based upon vehicle need can thus enhance fleet charging management and improve or maintain battery health for vehicles interfacing with the set of EVSEs according to the method 300.

Additionally or alternatively, the method 300 can implement system architecture for prioritized load sharing based upon another factor. For instance, the platform can be configured to recognize (e.g., through machine vision, through application interfaces, etc.) vehicles associated with a prioritized group (e.g., first response vehicles, emergency vehicles, vehicles associated with users paying a premium, vehicles associated with another prioritized group, etc.), and the associated EVSEs can be configured to provide power output (e.g., a maximum power output, a set minimum power output) in a prioritized manner to the vehicle(s) ahead of other non-prioritized vehicles. In variations, charging of prioritized vehicles or vehicles associated with prioritized users can be implemented in coordination with a state of charge (SOC) condition. In one such example, prioritized charging is provided by the EVSE(s) only when the SOC of the vehicle(s) is less than a desired level of charge (e.g., x % charge), where the desired level of charge can be governed by a battery health maintenance condition or another suitable factor (e.g., fleet manager guidance). In the event that all vehicles interfacing with a set of EVSEs are prioritized, the system can be configured to implement charging protocols described above in relation to steps S31-S39 (e.g., with respect to equal load sharing or need-based load sharing).

In relation to the above load management and distribution examples, an overarching energy management system (EMS) can operate at an appropriate scale (e.g., building scale, site scale, block scale, street scale, town scale, city scale, other geographic domain scale, etc.) in order to control energy load to devices and/or other apparatuses interfacing with the grid. As such, the system associated with load management and distribution can include structural and/or software architecture interfaces with the EMS, in order to allow load control ability (e.g., through an application with a corresponding application programming interface, API) of EVSEs in coordination with the EMS. As such, a platform portion of the EMS can manage all EVSEs covered by the EMS, and the API of the system can include architecture for adjusting power output (e.g., in relation to adjusting load value and duration) and/or resetting power output to a default value (e.g., maximum output, limited output, etc.).

1.3 Authentication Codes

Figure 7:
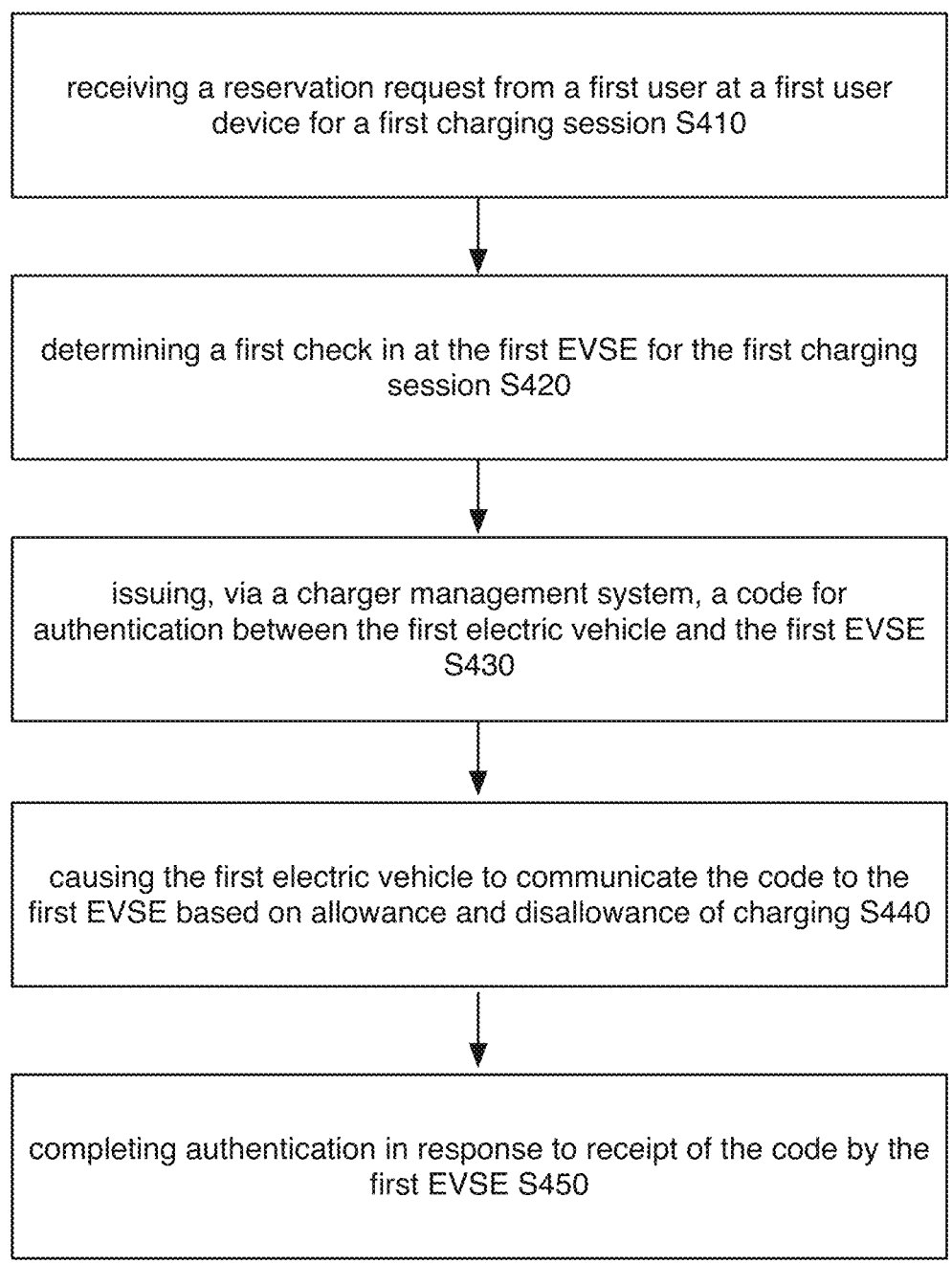
FIG. 7 includes a flowchart representation of a variation of an embodiment of a method.

As shown in FIG. 7, embodiments of a method 400 (e.g., for charging a first electric vehicle at an EVSE), can include: receiving a reservation request from a first user at a first user device for a first charging session S410 (e.g., wherein the first user is associated with the first electric vehicle, and wherein the reservation request comprises at least one reservation parameter indicative of the first charging session for the first electric vehicle; etc.); determining a first check in at the first EVSE for the first charging session S420; issuing, via a charger management system, a code for authentication between the first electric vehicle and the first EVSE S430; causing the first electric vehicle to communicate the code to the first EVSE based on allowance and disallowance of charging S440; and/or completing authentication in response to receipt of the code by the first EVSE S450.

Embodiments of the methods 100, 300, 400 and/or the system 200 can function to enable any EVSE (e.g., any charging equipment) to handle ad hoc and/or reserved charging.

2.1 Receiving a Reservation Request.

Embodiments of the methods described can include receiving a reservation request S110, S310, S410, which can function to receive information regarding a request for a reserved charging session (and/or ad hoc charging session; etc.).

Reservation requests are preferably digital requests received (e.g., wirelessly received; etc.) from a user at a user device. In a specific example, a reservation request can be received via a mobile application executing on a mobile user device of a user associated with an electric vehicle. In a variation, one or more reservation requests can be made at an EVSE (e.g., at a user interface of the EVSE; etc.). However, reservation requests can be made at any suitable location by any suitable devices and/or entities.

Reservation requests can be made from an entity remote from the EVSE(s) and/or charging location(s) that are requested. Additionally or alternatively, reservation requests can be made from an entity proximal (e.g., at; located near; close to; etc.) the EVSE(s) and/or charging location(s) that are requested, such as for an ad hoc charging session (e.g., a charging session for a current time at a proximal EVSE, etc.). However, reservation requests can be by entities at any suitable distance from EVSEs and/or charging locations.

Reservation requests can be manually made (e.g., by a user) and/or automatically made (e.g., by autonomous electric vehicles and/or non-autonomous electric vehicles, such as based on predefined rules; by any suitable computing devices; by a centralized reservation system; etc.). However, reservation requests can be made and/or received in any suitable manner.

Reservation requests are preferably received at a reservation system (e.g., a centralized reservation system; etc.), such as a reservation system that receives (and/or processes) reservation requests from a plurality of users for a plurality of EVSEs for charging a plurality of electric vehicles. Additionally or alternatively, reservation requests can be received at any suitable component (e.g., directly at an EVSE, etc.).

Reservation requests preferably include one or more reservation parameters indicating information (e.g., a scheduled time period for a charging session; location data; user data; etc.) regarding the requested charging session. Reservation parameters preferably include at least one of: reservation start time (e.g., start time for a charging session; etc.); reservation end time (e.g., end time for a charging session; etc.); and location (e.g., location of a user relative an EVSE and/or charging location; location coordinates of a user; such as based on location of a corresponding user device; such as based on GPS coordinates of a user device; etc.). Additionally or alternatively, reservation parameters can include any one or more of: destination data (e.g., requested destination for a charging location; etc.); origin data (e.g., current location data; etc.); EVSE data (e.g., data indicating a requested EVSE and/or associated information; data describing the EVSE, such as type of EVSE; a physical identifier; location of the EVSE; etc.); user data (e.g., user account information; location information; etc.); electric vehicle data (e.g., describing an electric vehicle to be charged in a reserved charging session; etc.); charging session data (e.g., requested charging features; etc.); location requests (e.g., indicating requested charging locations and/or EVSE(s); requested nearby institutions such as markets, restaurants, etc., nearby to the charging location; etc.); and/or any other suitable reservation parameters.

However, receiving a reservation request S110, S310, and/or S410 can be performed in any suitable manner, embodiments, variations, and examples of which are described in U.S. patent application Ser. No. 16/983,175 filed on Aug. 3, 2020, incorporated by reference above.

2.2 Scheduling a Reserved Charging Session.

Embodiments of the methods described can include scheduling one or more reserved charging sessions S120, which can function to reserve one or more charging sessions at one or more EVSEs and/or charging locations for one or more electric vehicles.

Charging sessions (e.g., a session for charging an electric vehicle; etc.) can include a reserved charging session, an ad hoc charging session (e.g., a charging session requested and/or implemented for a current, ad hoc time period; etc.), and/or other suitable types of charging sessions. A reserved charging session preferably includes a charging session that is reserved and scheduled ahead of the time period of charging. A reserved charging session is preferably associated with a scheduled time period during which charging of the electric vehicle occurs.

Scheduling one or more reserved charging sessions is preferably based on one or more reservation requests. Scheduling one or more reserved charging sessions can include processing one or more reservation parameters from one or more reservation requests, such as in order to schedule a reserved charging session according to the one or more reservation parameters. In an example, scheduling one or more reserved charging sessions can include scheduling a reserved charging session for a scheduled time period and an EVSE (and/or charging location) indicated by the set of reservation parameters from a received reservation request.

Alternatively, scheduling one or more reserved charging sessions can be performed in any suitable manner, embodiments, variations, and examples of which are described in U.S. patent application Ser. No. 16/983,175 filed on Aug. 3, 2020, incorporated by reference above.

2.3 Determining a Check in.

Embodiments of the methods 100, 300, and/or 400 can include determining one or more check ins for one or more charging sessions S130, S330 and/or S420, which can function to identify when a user, electric vehicle, and/or other entity has arrived for a given charging session.

Determining one or more check ins is preferably performed or one or more reserved charging sessions, but can additionally or alternatively be performed for any suitable type of charging sessions (e.g., ad hoc charging sessions; etc.).

A check in preferably indicates that an electric vehicle associated with a reserved charging session is ready to be charged (e.g., an EVSE is plugged into the electric vehicle; the electric vehicle is at the location of the EVSE, such as a selected EVSE and/or an EVSE associated with a determined charging location; etc.). Additionally or alternatively, a check in can indicate that a user has arrived at an EVSE and/or charging location corresponding to a reserved charging session, and/or can a indicate any other suitable information.

Determining a check in preferably includes determining one or more of a check in time (e.g., which can be compared to an early check in limit parameter if the check in time is prior to the corresponding reservation start time; which can be compared to a reservation grace period parameter if the check in time is after a corresponding reservation start time; etc.); user data (e.g., indicating the user who is checking in; etc.); electric vehicle data (e.g., indicating the electric vehicle to be charged during the reserved charging session; etc.); EVSE data (e.g., physical identifier and/or other suitable identifier of the EVSE that a user has checked in at, such as for when a plurality of EVSEs at one or more charging locations are eligible to be used by the user for a reserved charging session; etc.); and/or any other suitable data.

Determining one or more check ins can be based on one or more of: user input at a user device (e.g., user inputs, at a mobile application, indicating that the user has checked in and/or arrived at an EVSE and/or charging location associated with a reserved charging session; etc.); user location (e.g., based on location of a user device at and/or proximal an EVSE and/or charging location associated with a reserved charging session; etc.); user input at an EVSE; plugin of an EVSE into an electric vehicle; and/or any other suitable data indicative of a user check in for a charging session.

Determining one or more check ins is preferably performed by a reservation system (e.g., a centralized reservation system; a reservation system receiving check in indications from user devices, electric vehicles, EVSEs, and/or other suitable components; etc.), but can additionally or alternatively be performed by any suitable entities.

Determining a check in for a reserved charging session is preferably performed after scheduling the reserved charging session (e.g., where check ins are for reserved charging sessions that have been scheduled beforehand, etc.), but can additionally or alternatively be a performed at any suitable time relative portions of embodiments of the method 100, and/or at any suitable time.

However, determining one or more check ins for one or more charging sessions S130, S330 and/or S420 can be performed in any suitable manner, embodiments, variations, and examples of which are described in U.S. patent application Ser. No. 16/983,175 filed on Aug. 3, 2020, incorporated by reference above.

2.3.1 Code-Enabled Charging Experience

Figure 8A:
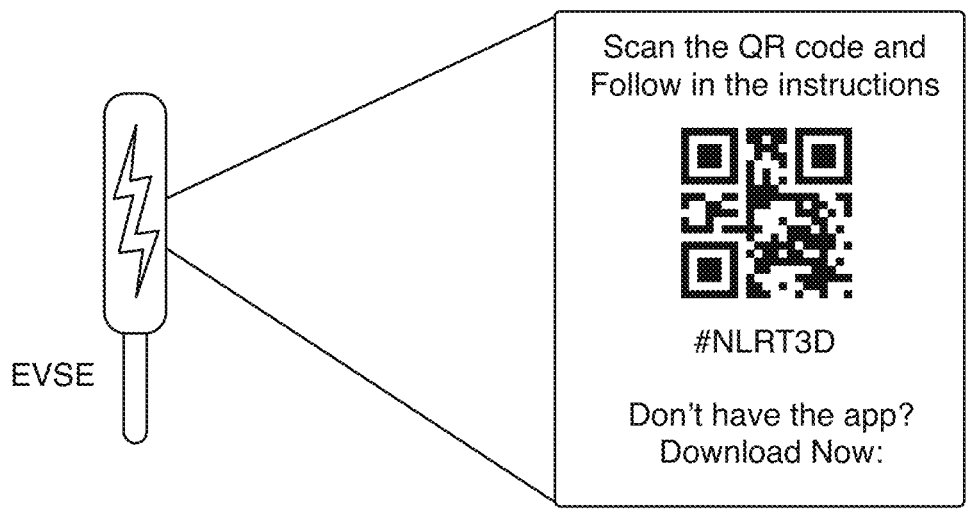
FIGS. 8A-8G depict schematics and flow charts of embodiments of a portion of the method for implementation of dynamic codes to facilitate charging sessions.
Figure 8B:
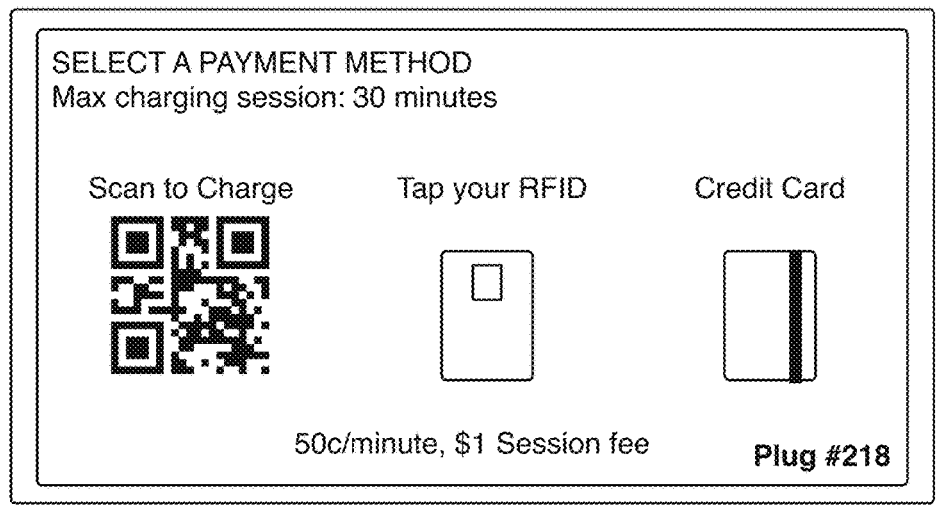
Figure 8C:
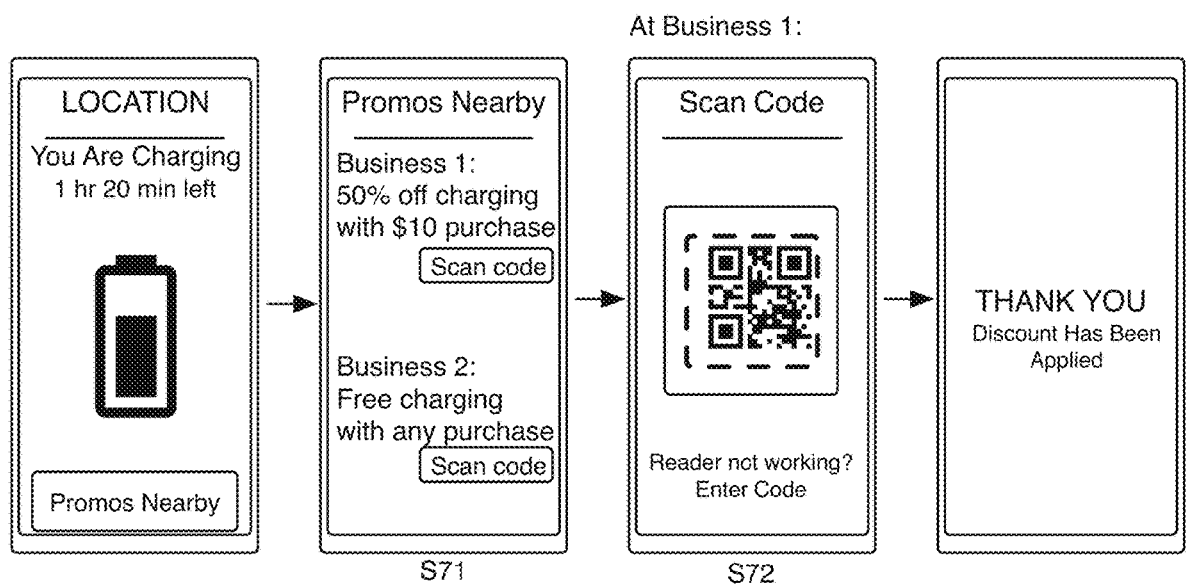
Figure 8D:
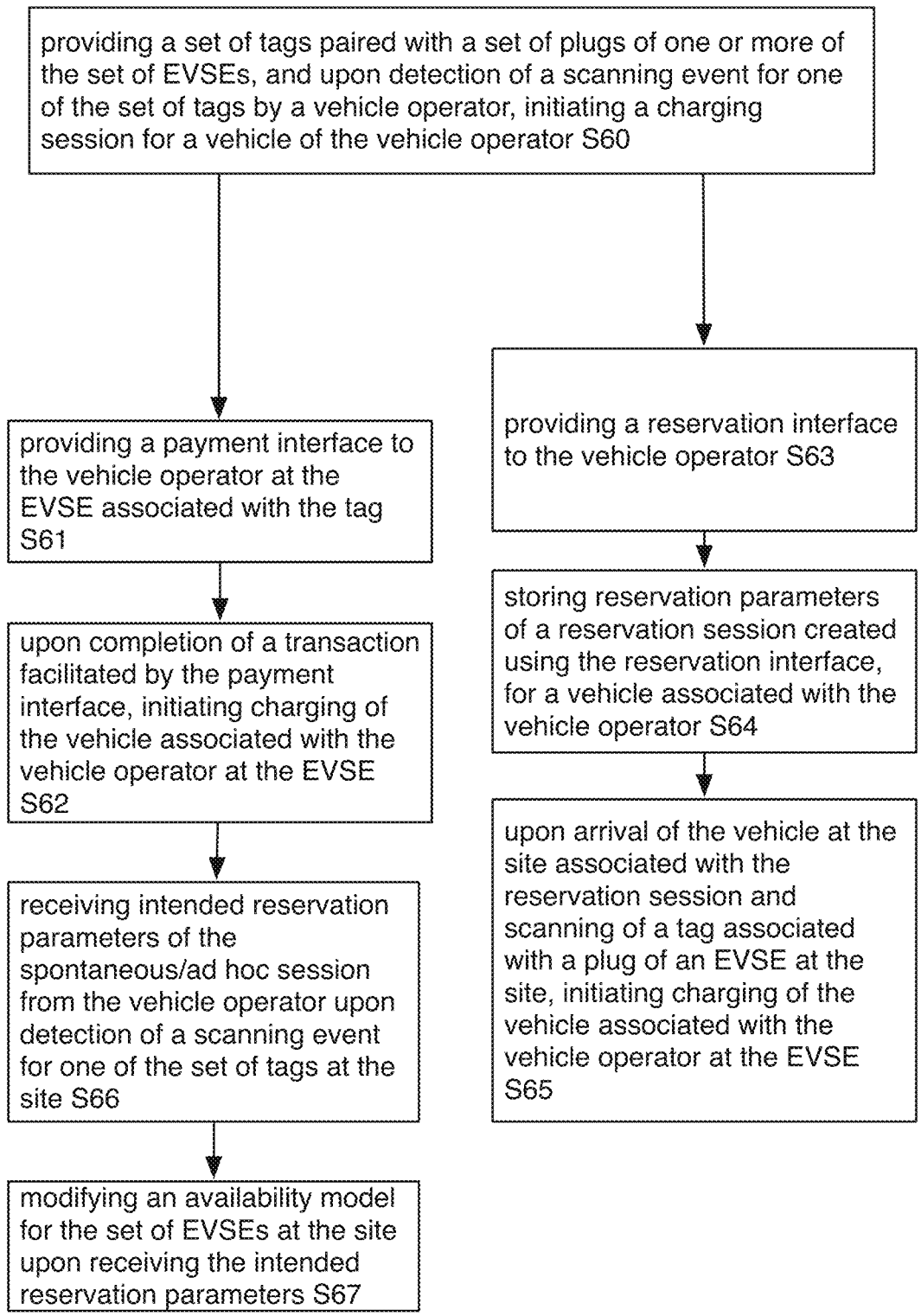

In one variation, as shown in FIGS. 8A-8C, the overarching system (e.g., EMS) can assign a unique identifier to each of a set of plugs associated with a set of EVSEs, where each of the set of EVSEs can have one or more plugs. During use, vehicle operators can then check in to a particular plug/EVSE using the unique identifier, where, as described in related examples, checking in can include scanning a tag associated with the plug/EVSE and encoding the unique identifier. As shown in FIG. 8A, the tag can include a QR code, and scanning the QR code using an image capturing application of a mobile device of a vehicle operator can trigger initiation of a charging session for the plug/EVSE. Embodiments of the tag can, however, have another suitable form (e.g., barcode, sequence of characters that can be manually or automatically entered, etc.) and/or be used for initiation of charging in another suitable manner. As such, methods associated with initiating vehicle charging sessions can include providing a set of tags paired with a set of plugs of one or more of the set of EVSEs, and upon detection of a scanning event for one of the set of tags by a vehicle operator, initiating a charging session for a vehicle of the vehicle operator S60, as shown in the flowchart of FIG. 8D.

In relation to ad hoc or spontaneous charging sessions, initiation of the charging session can include: providing a payment interface to the vehicle operator at the EVSE associated with the tag (e.g., through a display of the EVSE, at an application of the mobile device used to scan the tag, etc.) S61; and upon completion of a transaction facilitated by the payment interface, initiating charging of the vehicle associated with the vehicle operator at the EVSE S62. An example of the payment interface is shown in FIG. 8B.

In relation to reserved charging sessions (e.g., sessions reserved prior to arrival at the EVSE), the system can provide (e.g., through the application executing at the mobile device of a vehicle operator associated with a reserved charging session) a user interface depicting location features (e.g., location name, location address, etc.) associated with candidate EVSEs at which the vehicle can undergo charging sessions. The user interface can further allow the vehicle operator to bookmark a subset of candidate locations (e.g., to provide more efficient access to candidate sites during current/subsequent charging sessions). Then, once the vehicle is physically at the site of the EVSE associated with the reservation, the vehicle operator can access any available plug of the EVSE(s) at the site, and check in by scanning the tag of the plug to initiate charging. As such, as shown in FIG. 8D, initiation of the charging session can include: providing a reservation interface to the vehicle operator (e.g., at an application of a mobile device of the vehicle operator) S63; storing reservation parameters of a reservation session created using the reservation interface, for a vehicle associated with the vehicle operator S64, the set of reservation parameters including parameters for at least one of a site, a set of EVSEs at the site, and a time window associated with the reservation session; upon arrival of the vehicle at the site associated with the reservation session and scanning of a tag associated with a plug of an EVSE at the site, initiating charging of the vehicle associated with the vehicle operator at the EVSE S65.

For sites at which EVSE/plug reservation is available, the method can include (for spontaneous/ad hoc sessions): receiving intended reservation parameters of the spontaneous/ad hoc session from the vehicle operator upon detection of a scanning event for one of the set of tags at the site S66, where the reservation parameters include an intended duration of the charging session; and modifying an availability model for the set of EVSEs at the site upon receiving the intended reservation parameters S67. For sites at which EVSE/plug reservation is not available, initiation of the charging session can include charging the vehicle according to a set of power output parameters until at least one of the following occurs: a battery of the vehicle is fully charged, or a maximum charging session limit is incurred by the vehicle.

As shown in FIG. 8C, scanning of the tag can further trigger subsequent actions. For instance, upon detection of a scanning event associated with a tag, the system can provide promotional content to the vehicle operator (e.g., through an application of a mobile device used to scan the tag), where the promotional content includes a list of vendors in proximity to the site of charging. In providing the list, the system can extract the location of the EVSE associated with the tag, and implement a proximity model to extract a set of appropriate promotions (e.g., based upon a distance threshold, based upon a profile of the vehicle/vehicle operator, etc.) S71. A corresponding tag can also be available at a vendor site associated with the promotional content, and upon detection of a scanning event associated with the corresponding tag and the vehicle operator, the vehicle operator can be provided with the promotion S72. As such, while the vehicle is charging, the vehicle operator can be incentivized to support operations of one or more nearby vendors in a manner that benefits both the vehicle operator and the vendor(s).

2.3.1.1 Dynamic Machine-Readable Codes for Facilitating Charging Sessions

Figure 8E:
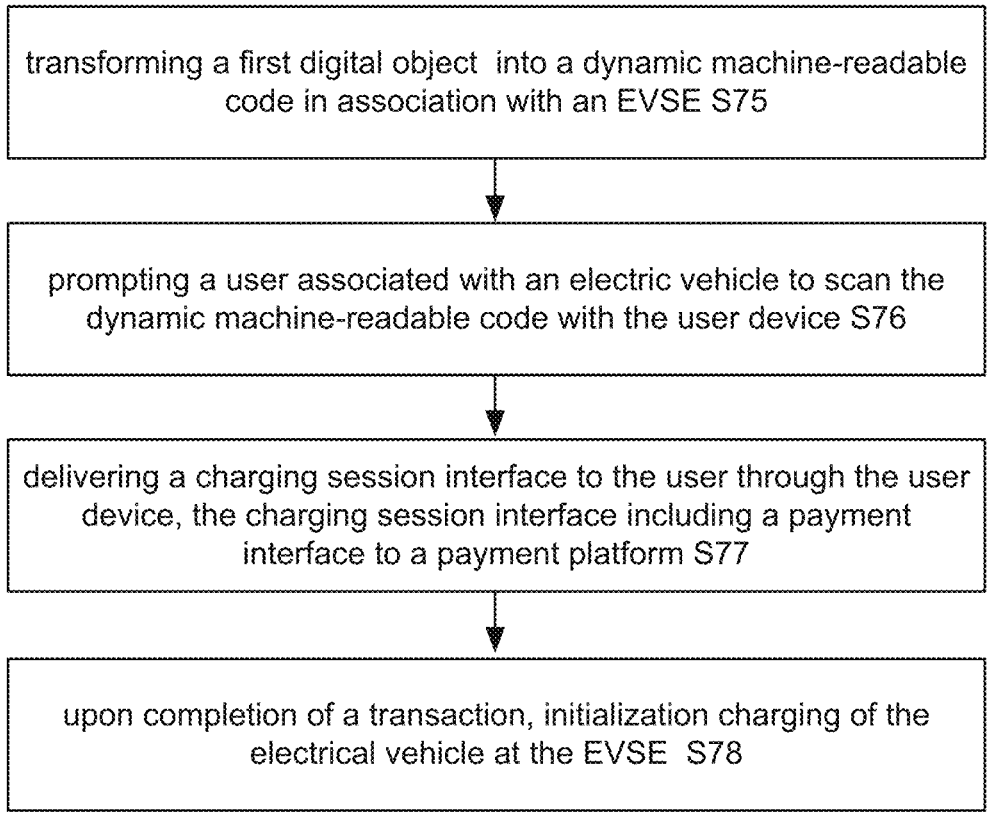

In some embodiments, an example of which is shown in FIG. 8E, methods described can include transforming a first digital object (e.g., uniform resource locator (URL), other character string, image data, other digital object) into a dynamic machine-readable code in association with an EVSE S75; prompting a user associated with an electric vehicle to scan the dynamic machine-readable code with the user device S76, where scanning can occur outside of a platform-specific application environment (e.g., with a general-use camera application); delivering a charging session interface to the user through the user device, the charging session interface including a payment interface to a payment platform S77; and upon completion of a transaction, initialization charging of the electrical vehicle at the EVSE S78.

Figure 8F:
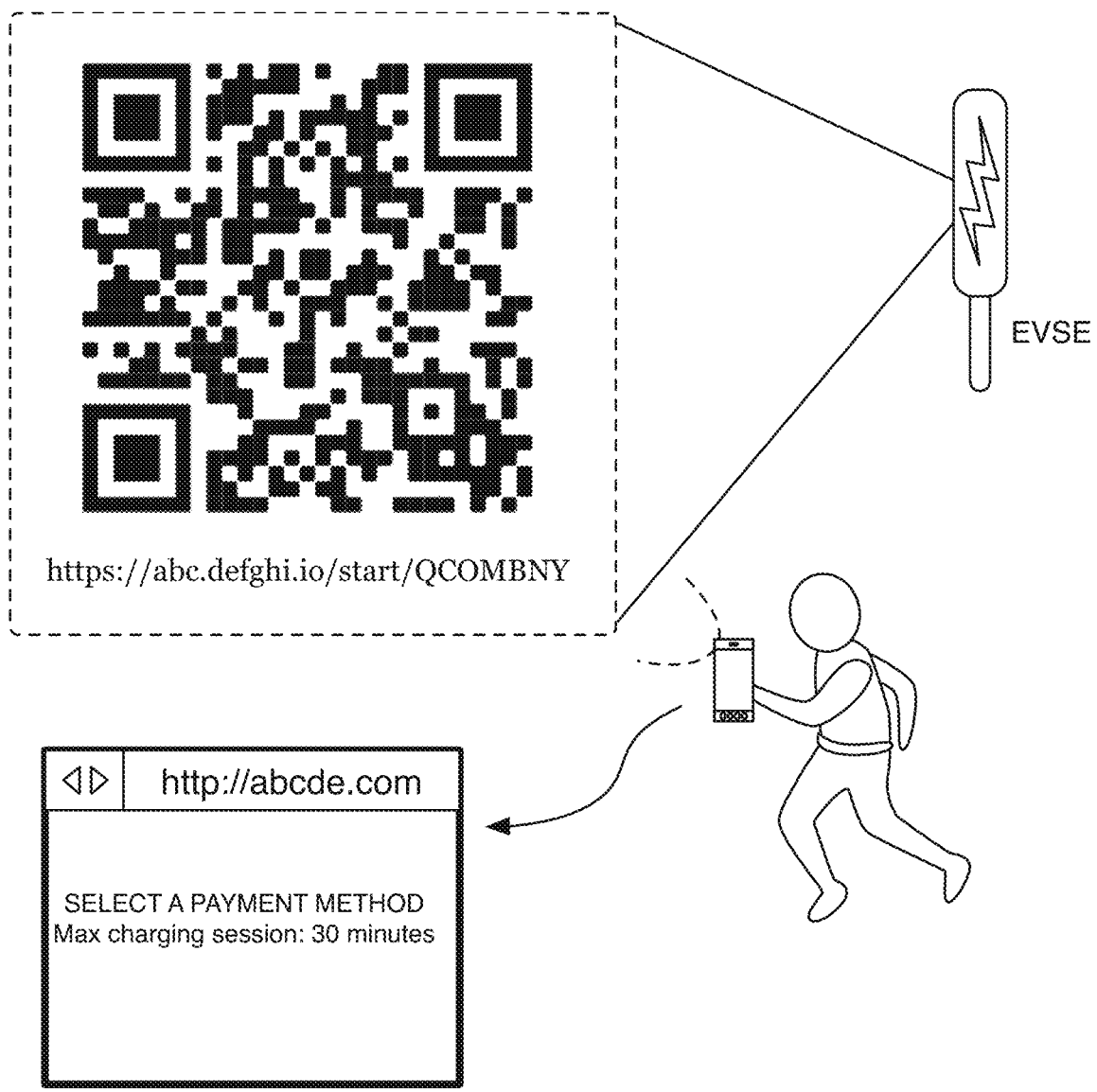

In the example shown in FIG. 8F, the dynamic machine-readable code (e.g., QR code) provided was generated/transformed from the URL positioned adjacent to the dynamic machine-readable code, where the URL includes or otherwise encodes a unique identifier of the EVSE. The dynamic machine-readable code is used to rapidly identify which EVSE a user associated with an electric vehicle is trying to interface with/activate. As such, in this example, even without a platform-specific application (e.g., a specific application designed for interacting with the EVSEs), users can scan the dynamic machine-readable code (e.g., with a general-use camera application of a mobile device) and the system will present the user with a site, where the site presents a payment interface with additional instructions (e.g., to input credit card or other payment information) for conducting a transaction, in order to enable initiation of charging at the EVSE. Additionally or alternatively, the application could still scan machine-readable aspects of codes provided at the EVSE by simply parsing out the identifier portion of a provided URL (e.g., with functionality of the application for processing a unique identifier of the EVSE using machine vision algorithms).

2.3.1.2 User Identification Linked with User-Associated Objects and Devices

In some embodiments, the overarching system can include architecture for linking user-associated objects and/or other devices with a user identification or account of the user, in order to allow the user to interact with an EVSE (e.g., authenticate a charging sessions, initiate a charging session, terminate a charging session, etc.) using the user-associated objects and/or other devices.

In one example, the overarching system described allows any suitable object or device to serve as a unique identifier for association with a user account stored at the overarching system, in order to facilitate charging sessions. As such, users can interact with EVSEs and/or the overarching system without carrying additional items beyond what they would normally have to carry.

In examples, objects/devices that can be uniquely identified with the user's account can include: employee badges, housing key fobs, hotel keys, other charging network RFID cards, credit cards (e.g., encrypted credit card information), wearable electronic devices (e.g., Apple™ wearable devices, Android™ wearable devices, etc.), and other objects. Thus, with a valid/verified account within the overarching system, where the overarching system provides user interfaces through a mobile device application or a web application, the user can add any and/or multiple objects and devices to his/her account, for use to facilitate charging of an associated electric vehicle.

In an example implementation, once the object(s) and/or device(s) is/are associated with the user's account via an appropriate interface (e.g., mobile application interface, web interface), the user can present the object(s) and/or device(s) at the EVSE (e.g., by scanning, by swiping). The overarching system then uses the unique ID of the object(s)/device(s) to look up the user's platform account and can subsequently perform an action (e.g., initiate a charging session) with the payment method set up for the user. As such, any item (e.g., RFID, other device, other active object, or credit card) can be simply used as a unique identifier for the user. In embodiments where the item is capable of facilitating a transaction (e.g., such as in a credit card), the item can function as a user identifier without being involved in a financial transaction; however, the item can additionally be used in a financial transaction associated with electric vehicle charging, in coordination with user identification/authentication.

In embodiments where the user has multiple object(s) and/or device(s) associated with his/her account, the overarching system can prompt the user (e.g., through the EVSE, through the mobile application, through the web application, etc.), to present a subset or all of the multiple object(s) and/or device(s) for detection, as a form of multi-factor authentication. As such, embodiments where the user has multiple object(s) and/or device(s) associated with his/her account can provide a mechanism for improved security of transactions through multi-factor authentication.

Figure 8G:
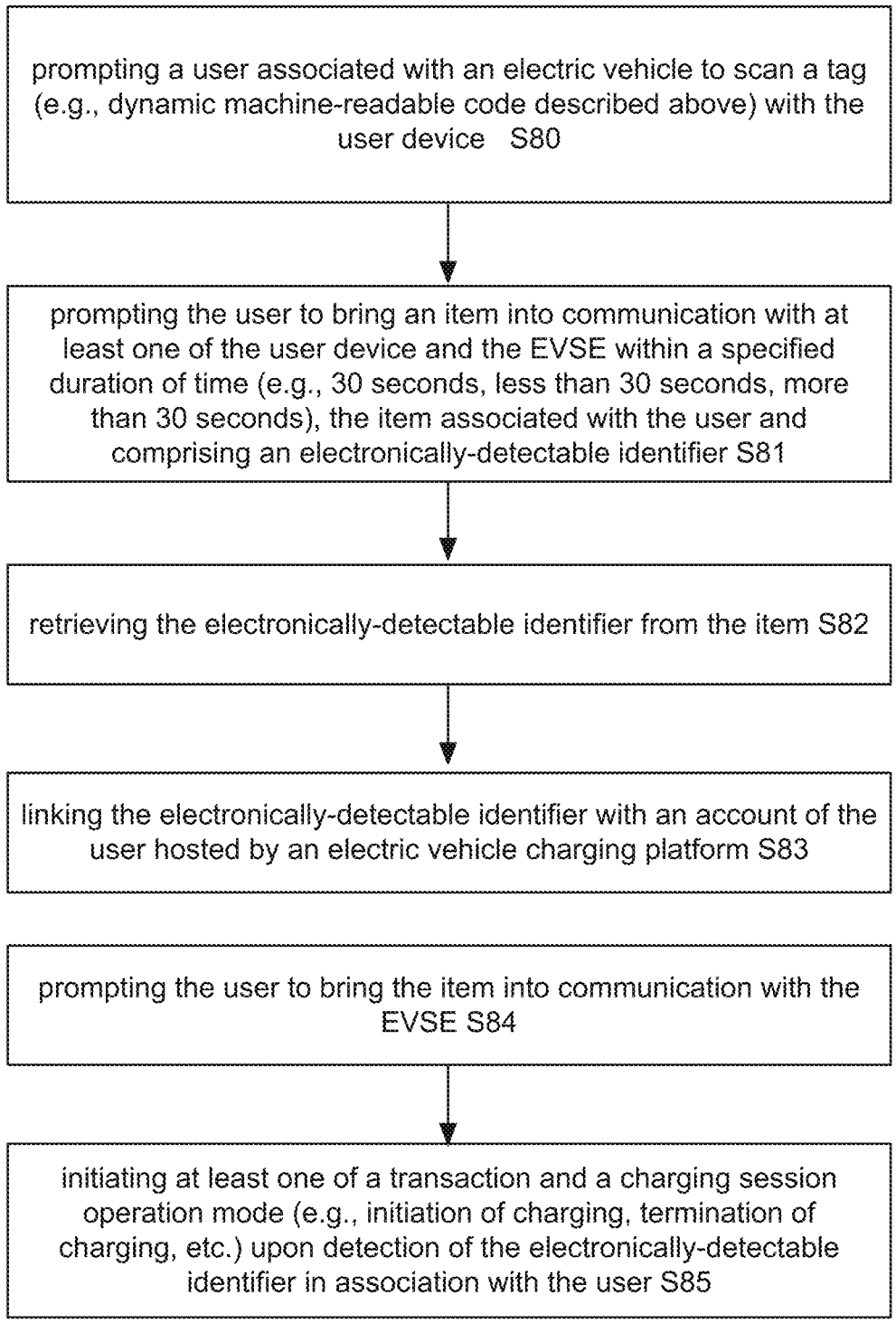

In one variation of implementation, as shown in FIG. 8G, the method can include: prompting a user associated with an electric vehicle to scan a tag (e.g., dynamic machine-readable code described above) of an EVSE (e.g., in a prior interaction) with the user device S80, where scanning can occur outside of a platform-specific application environment (e.g., with a general-use camera application); prompting the user to bring an item into communication with at least one of the user device and the EVSE within a specified duration of time (e.g., 30 seconds, less than 30 seconds, more than 30 seconds), the item associated with the user and comprising an electronically-detectable identifier S81; detecting the electronically-detectable identifier from the item S82; and linking the electronically-detectable identifier with an account of the user hosted by an electric vehicle charging platform S83. Then, in association with an intended charging session, the method can include: prompting the user to bring the item into communication with the EVSE S84; and initiating at least one of a transaction and a charging session operation mode (e.g., initiation of charging, termination of charging, etc.) upon detection of the electronically-detectable identifier in association with the user S85.

This variation of the method is configured to prevent challenges arising from a user's lack of knowledge of encoded, hidden, or otherwise unknown identifiers of the item/object/device intended to be added to the user's account. This variation of the method can also prevent challenges arising from the presence of multiple identifiers associated with the item/object/device intended to be added to the user's account, which can create in relation to different readers at different EVSEs configured to read different types of identifiers.

Sessions associated with the method(s) and systems described can be spontaneous and/or associated with reservations. As such, upon detecting an interaction for a session, the platform can tag a reservation associated with a user account as served (if the reservation exists in the user's account). Furthermore, at reservation enabled EVSE sites, the platform can be configured to force a maximum charging session limit to be set, in order to prevent a bad actor from reserving an EVSE for an inconsiderate amount of time that adversely affects other users.

As such, in some embodiments, all spontaneous sessions w/ RFID or credit cards are assumed to last a maximum charging session limit. Spontaneous sessions (e.g., requested through a mobile application) can be configured to prompt users to provide their intended charging duration, with the default session duration set to a maximum possible duration (e.g., either maximum session limit or until the start of next reservation). As such, the platform can retrieve durations of spontaneous sessions to guide scheduling of future sessions. The platform can also be configured to enable subscriptions to notifications, such that a user who has an interest to charge at a location can be notified in case a spontaneous session ends early. Using the user's location info through integration with user location tracking devices increases the likelihood that the user actually plugs in after receiving the availability notification. The platform can also implement or include architecture for performing data patterning (e.g., AI or machine learning) operations, in order to perform one or more of: identification of which users have an interest to charge at a location but who are not currently charging, identification of users who might arrive early at a charging site (e.g., based upon integration with location tracking devices of the users, based upon integration with calendar applications of the users, based upon integration with smart assistants of the users, etc.), estimation of anticipated arrival times, estimations of anticipated departure times, characterization of user patterns of behavior, and/or other operations.

In variations, the platform can include architecture for enabling other operations. For instance, the following operations can be enabled: First-come-first-serve operation modes (e.g., no reservations permitted); reservation-enabled operation modes (e.g., reservations permitted, with indicators for indicating EVSE availability); conditional reservability operation modes (e.g., with operation modes for special vehicle classes, such as fleet vehicles or emergency vehicles, with operation modes for achieving desired states of charge in coordination with vehicle telematic information, etc.); and/or other operation modes.

Other variations can be implemented by the system(s) described and/or other suitable systems.

2.4 Causing Charging of an Electric Vehicle.

Embodiments of the methods described (e.g., methods 100, 300, and/or 400) can include causing charging of one or more electric vehicles for one or more reserved charging sessions S140, S340, and/or S350, which can function to provide charging in one or more reserved charging sessions.

Causing charging of one or more electric vehicles is preferably performed by causing one or more EVSEs to charge the one or more electric vehicles, but can additionally or alternatively be performed with any other suitable components.

Causing charging of one or more electric vehicles is preferably based on one or more integrations with one or more EVSEs. In examples, an integration (e.g., of the reservation system; etc.) with one or more EVSEs can allow remote communication (e.g., wireless communication; etc.) between the one or more EVSEs and another component (e.g., reservation system; etc.). In specific examples, integrations with one or more EVSEs can be based on one or more of: the Open Charge Point Protocol (OCPP) (e.g., for supporting communication between EVSEs and a central management system network; etc.), the Open Charge Point Interface protocol (OCPI) (e.g., for supporting connections between mobility service providers such as entities having electric vehicle drivers as customers, and Charge Point operators such as managers of EVSEs; etc.); and/or any other suitable protocols. In a specific example, an integration with one or more EVSEs can include an integration, via OCPI, with the network who can forward commands (e.g., control signals; etc.) to corresponding EVSEs.

Controlling (e.g., remotely controlling; etc.) one or more EVSEs can include issuing one or more of: start charging commands (e.g., a "remoteStart" API call through OCPI, where the API call can result in a control signal being forwarded by the network to one or more EVSEs; for the EVSE to begin charging of an electric vehicle; such as in response to determining a check in of a user for a reserved charging session associated with the EVSE; etc.); stop charging commands (e.g., a "remoteStop" API call through OCPI, where the API call can result in a control signal being forwarded by the network to one or more EVSEs; for the EVSE to stop charging of an electric vehicle; such as in response to a current time reaching a reservation end time; such as in response to a fully charged state of the electric vehicle; etc.); and/or any other suitable commands (e.g., for requesting data, such as charging session data for updating a calendar associated with the EVSE; etc.).

In a specific example, causing the EVSE to charge an electric vehicle (e.g., for an ad hoc charging session; etc.) based on an integration with the EVSE can include remotely issuing a first start charging command to the EVSE; and where causing the EVSE to charge an electric vehicle (e.g., a different electric vehicle; a same electric vehicle; etc.) (e.g., for a reserved charging session; etc.) based on an integration with the EVSE can include remotely issuing a second start charging command to the EVSE.

In variations, for a given reserved charging session, a plurality of EVSEs (e.g., a plurality of EVSEs in a single charging location; etc.) can service an electric vehicle associated with the reserved charging session. In a specific example, a user scheduled for a reserved charging session at a charging location including a plurality of EVSEs is not limited to use of a single EVSE of the plurality of EVSEs for the reserved charging session. In a specific example, a user can use any suitable available EVSE for a charging session at a charging location including a plurality of EVSEs. In a specific example, a charging location including a plurality of EVSEs can specify that a predetermined number of the plurality of EVSEs (e.g., a predetermined number that is less than the number of EVSEs in the plurality of EVSEs; etc.) are to be made available for reserved charging sessions (e.g., x number of EVSEs allotted to serving reserved charging sessions out of y number of total EVSEs for the charging location; etc.), and/or the remaining number of EVSEs are to be made available on a first come first served basis (e.g., y number of total EVSEs minus x number of EVSEs allotted to serving reserved charging sessions; etc.). In a specific example, the predetermined number of the plurality of EVSEs allotted for reserved charging sessions can correspond to any suitable EVSEs of the plurality of EVSEs (e.g., specific EVSEs are not specified; etc.), where a user can select any available EVSE of the plurality of EVSEs for a reserved charging session (e.g., such as long as the number of EVSEs serving reserved charging sessions is equal to the predetermined number, x, of EVSEs allotted to serving reserved charging sessions at the charging location; etc.). Alternatively, the predetermined number of the plurality of EVSEs allotted for reserved charging sessions can correspond to specified EVSEs (e.g., specified by a site host, a community management admin, etc.).

Causing an EVSE to charge an electric vehicle can be based on a physical identifier (and/or other suitable identifiers) for the EVSE. The physical identifier can be physically present at the EVSE (e.g., on the EVSE; etc.), can be unique to the EVSE, and/or can otherwise be configured. One or more physical identifiers can be mapped to one or more virtual identifiers (e.g., stored at a reservation system in association with the EVSE; etc.), but can additionally or alternatively associated with any suitable components. Causing an EVSE to charge an electric vehicle based on a physical identifier can include selecting the EVSE to remotely issue a command to based on the physical identifier of the EVSE. In a specific example, an EVSE can be from a set of EVSEs associated with a charging location (e.g., where a single charging location includes a plurality of EVSEs; etc.), where each EVSE from the set of EVSEs corresponds to a unique physical identifier, where remotely issuing a first start charging command includes remotely issuing the first start charging command to the EVSE based on the physical identifier for the EVSE. In the specific example and/or other suitable specific examples, remotely issuing a second start charging command can include remotely issuing the second start charging command to the EVSE based on the physical identifier for the EVSE.

In examples, a user can provide a physical identifier (e.g., for an EVSE selected by a user from a set of EVSEs associated with a single charging location; etc.). Users can provide physical identifiers through one or more of: a user device (e.g., through an application for the user device; etc.), an EVSE (e.g., through an EVSE interface; etc.), an electric vehicle, and/or any other suitable components. In a specific example, the method 100 can include prompting a user to provide the physical identifier for the EVSE selected by a user from the set of EVSEs (e.g., of a single charging location; etc.) for the reserved charging session; and/or receiving the physical identifier for the EVSE from the user. Additionally or alternatively, an EVSE physical identifier and/or other suitable EVSE identifiers can be automatically collected (e.g., based on a plug-in of the EVSE charger to the electric vehicle, etc.). EVSE identifiers and/or other suitable identifiers can be collected from EVSEs, electric vehicles (e.g., plugged-in with an EVSE; etc.), mobile devices (e.g., mobile phones, etc.), users, and/or any other suitable entities.

Causing an EVSE to charge an electric vehicle can be based on a power distribution type associated with one or more reservation parameters and/or other suitable parameters. There can be a user opt-in distribution type for power distribution associated with the solar production parameter, the infrastructure-limitation parameter, and the time-of-use parameter; a uniform power distribution type associated with the equally reduced power reduction parameter and the separately reduced power parameter; and a condition-based distribution type for distributing power associated with the condition-based parameter. A user opt-in power distribution type causes the EVSE to dynamically throttle the power output based on the associated reservation parameter (and/or other suitable reservation parameters that justifies throttling the EVSE to satisfy said reservation parameters). In specific examples, the reservation parameter can include one or more opt-in indications or opt-out indications for one or more power distribution types (e.g., a power reduction offered at a cheaper price. In examples, a uniform power distribution type causes the EVSE to throttle power equally among a set of EVSE (e.g., to keep total kW under a certain amount), or to deactivate individual EVSEs among a set of EVSE (e.g., deactivating a number of EVSE among a set of EVSE to keep total kW under a certain amount, etc.).

In examples, a condition-based power distribution type causes the EVSE to charge the electric vehicle based on the battery level associated with (e.g., needed for; required by; correlated with; etc.) a route or job (e.g., using telematics data, vehicle data, user data, and/or other suitable data and parameters, etc.). In a specific example, a condition-based distribution type can intelligently distribute power by determining the battery level needed based on the difference between current battery level and the needed battery level for the next job or route, and causing the EVSE to charge the electric vehicle for the needed battery level. A condition-based power distribution type can additionally or alternatively be used to plan for a road trip (via mobile applications, etc.), whereby optimal charging stops can be determined based on battery level needed for the subsequent charging stop (e.g., using telematics data such as including one or more of driver driving efficiency, total driving distance between charging stops, EVSE data indicating current availability, etc.).

In a specific example, user opt-in distribution types can be implemented for non-fleet users and/or scenarios, and condition-based power distribution types can be implemented for fleet users and/or scenarios.

However, power distribution types can be configured in any suitable manner.

In a specific example, causing the EVSE to charge an electric vehicle (e.g., for an ad hoc charging session; etc.) in accordance with a power distribution type based on an integration with the EVSE can include remotely issuing a start charging command to the EVSE; where causing the EVSE to charge an electric vehicle (e.g., a different electric vehicle; a same electric vehicle; etc.) (e.g., for a reserved charging session; etc.) based on an integration with the EVSE can include remotely issuing a continue charging command in accordance with a power distribution type for the charging session; and where causing the EVSE to continue charging based on an integration with the EVSE can include remotely issuing a throttle power output command for the EVSE in accordance with the power distribution type and/or access parameters.

In variations, electric vehicle location can be used in facilitating access and/or authentication. For example, if an electric vehicle arrives (e.g., tracked using vehicle location, etc.) proximal (e.g., at, etc.) an EVSE location within a threshold time period for a charging session (e.g., a reserved charging session where the electric vehicle is expected to arrive at the location and time; etc.), then access and/or authentication can be automatically granted (e.g., not requiring a morse code handshake, etc.). In a specific example, if more than one vehicle arrives in a threshold time window, a morse code authentication process can be used to differentiate the vehicles (e.g., where a short code, such as a 2-digit code, could be used).

In variations, group codes can be generated for a fleet, community, and/or other set of vehicles, where such a code can be shared across the set of vehicles. A group code can be refreshed (e.g., on a periodic interval, such as daily, etc.). Communities can be associated with and/or include one or more of workplaces, multi-unit dwellings, school campuses, hospitality, and/or other suitable community settings. In specific examples, group codes can be 3-digits in length and/or any suitable length (e.g., shorter lengths; longer lengths to accommodate scenarios where a larger number of vehicles are expected to be at an EVSE site at the same time, where the longer group code can be used to differentiate, etc.). In specific examples, group codes can be associated with different access parameters (e.g., a pricing parameter, a dedicated time slot parameter, etc.) to allow for group and/or time-specific pricing.

However, morse codes and associated authentication approaches can be configured in any suitable manner.

Causing charging of one or more electric vehicles is preferably performed by a reservation system (e.g., a centralized reservation system in remote communication with a set of EVSEs for issuing one or more commands; etc.), but can additionally or alternatively be performed by any suitable components.

Causing charging of one or more electric vehicles is preferably performed after (e.g., in response to; etc.) determining a check in of a user for a reserved charging session (e.g., where an EVSE associated with the reserved charging session is caused to charge an electric vehicle for a user associated with the reserved charging session; etc.), but can additionally or alternatively be performed at any suitable time relative portions of embodiments of the method 100, and/or at any suitable time.

Causing charging of one or more electric vehicles can be based on (e.g., dependent upon, etc.) determining payment (e.g., for the charging session; etc.) and/or authentication. Determining payment and/or authentication can be performed by one or more of: a charger management system, a reservation system, an application of a user device, an EVSE, and/or any other suitable components.

However, causing charging of one or more electric vehicles S140, S340, and/or S350 can be performed in any suitable manner.

2.5 Facilitating an Ad Hoc Charging Session.

Embodiments of the methods 100, 300, and/or 400 can additionally or alternatively include facilitating one or more ad hoc charging sessions S150, which can function to guide and/or implement one or more ad hoc charging sessions. Additionally or alternatively, embodiments of the method 100 can prevent one or more ad hoc charging sessions (e.g., in response to determination of ineligibility of a user for an ad hoc charging session; etc.).

An ad hoc charging session preferably includes a charging session that was not reserved ahead of time, such as a charging session that is being requested for a current time at an EVSE and/or charging location, such as at an EVSE and/or charging location that is proximal (e.g., nearby; at; etc.) a user location (e.g., determined based on a user device location; etc.).

Facilitating one or more ad hoc charging sessions can additionally or alternatively include determining eligibility for an ad hoc charging session (e.g., for an electric vehicle at an EVSE; etc.) S152; accounting for an ad hoc charging session S154; causing an EVSE to charge the electric vehicle for the ad hoc charging session S156; and/or any other suitable processes for facilitating one or more ad hoc charging sessions S150.

Determining eligibility for an ad hoc charging session S152 can function to determine whether to allow an ad hoc charging session for a user. Determining eligibility for an ad hoc charging session is preferably based on one or more reservation parameters (e.g., from a reservation request; etc.) and/or one or more EVSE reservation parameters.

In examples, determining eligibility for an ad hoc charging session can be based on a comparison between an ad hoc time period (e.g., a current time period; a time associated with request of an ad hoc charging session by a user; etc.) and a scheduled time period. In a specific example, determining eligibility for the ad hoc charging session based on the comparison between the ad hoc time period and the scheduled time period can include: determining a length of time difference between the ad hoc time period and the scheduled period (e.g., where the length of time difference can include the amount of time from a current time until the reservation start time for the next scheduled reserved charging session; etc.); and/or in response to the length of time difference exceeding a first length of time difference threshold (e.g., a predetermined threshold, such as 30 minutes, 45 minutes, 60 minutes, etc.; an automatically determined threshold, such as based on the schedule of reserved charging sessions and/or other suitable variables; etc.), determining that a user (e.g., associated with the second electric vehicle, etc.) and/or other suitable entity is eligible for the ad hoc charging session. In a specific example, determining eligibility for the ad hoc charging session based on the comparison between the ad hoc time period and the scheduled time period can include: in response to the length of time difference exceeding a second length of time difference threshold (e.g., when the time until the upcoming reserved charging session is sufficiently large, such as greater than the maximum session duration for the EVSE; such as greater than an ad hoc time period corresponding to a predicted ad hoc charging session duration indicated by a user input describing an end time and/or desired charging session duration for the ad hoc charging session; etc.), determining that a user (e.g., associated with second electric vehicle; etc.) and/or other suitable entity is eligible for the ad hoc charging session for a duration specified by a maximum session duration parameter associated with the EVSE. Determining eligibility for an ad hoc charging session can include collecting one or more user inputs (e.g., in response to prompting the user for a user input, such as at a mobile application and/or at a vehicle application; etc.) describing an end time and/or desired charging session duration for the ad hoc charging session, such as where an ad hoc time period can be based on the one or more user inputs (e.g., desired ad hoc charging session duration and/or end time; etc.). Determining eligibility can include processing an ad hoc charging session as a reserved charging session associated with a reservation start time parameter of the current time (e.g., now).

However, determining eligibility for an ad hoc charging session S152 can be performed in any suitable manner.

Accounting for an ad hoc charging session S154 can function to track, record, and/or otherwise account for the ad hoc charging session, such as to prevent scheduling of reserved charging sessions that would overlap with the ad hoc charging session and/or a threshold time period after the ad hoc charging session. Accounting for one or more ad hoc charging sessions can include one or more of: updating EVSE calendars (e.g., for EVSEs used in the one or more ad hoc charging sessions; etc.); recording ad hoc charging session data; and/or any other suitable processes.

However, accounting for an ad hoc charging session S154 can be performed in any suitable manner.

Causing an EVSE to charge one or more electric vehicles for one or more ad hoc charging sessions S156 can function to implement the ad hoc charging session with the EVSE.

Causing an EVSE to charge one or more electric vehicles for one or more ad hoc charging sessions is preferably performed after (e.g., in response to; etc.) receiving a request for an ad hoc charging session (e.g., from a user at a user device; from a user via an EVSE interface; etc.), but can additionally or alternatively be performed at any suitable time relative portions of embodiments of the method 100, and/or at any suitable time.

Causing an EVSE to charge one or more electric vehicles for one or more ad hoc charging sessions S154 can be performed in any suitable manner analogous to and/or similar to causing an EVSE to charge one or more electric vehicles for one or more reserved charging sessions S140. However, causing an EVSE to charge one or more electric vehicles for one or more ad hoc charging sessions S156 can be performed in any suitable manner.

Any suitable portions of facilitating one or more ad hoc charging session with an EVSE can be performed at any suitable time period relative facilitating one or more reserved charging sessions with the EVSE. In a specific example, an EVSE can be used in implementing a first ad hoc charging session, followed by a first reserved charging session, followed by a second ad hoc charging session, followed by a second reserved charging session, etc. Additionally or alternatively, any suitable number of ad hoc charging sessions and/or reserved charging sessions can be implemented with an EVSE in any suitable order at any suitable time (e.g., any suitable mixture of ad hoc charging session(s) and reserved charging session(s), etc.). However, facilitating one or more ad hoc charging sessions can be performed at any suitable time relative portions of embodiments of the method 100, and/or at any suitable time.

Any suitable number of ad hoc charging sessions can be facilitated. In a specific example, an EVSE can be used in implementing a plurality of ad hoc charging sessions and a plurality of reserved charging sessions for a given time period (e.g., for a given day; etc.). In a specific example, a first EVSE can be used in implementing an ad hoc charging session concurrently with a second EVSE used in implementing a reserved charging session. However, any suitable number of EVSEs can implement any suitable number of ad hoc charging sessions and/or reserved charging sessions concurrently, sequentially, and/or at any suitable time in any suitable order.

However, facilitating one or more ad hoc charging sessions S150 can be performed in any suitable manner. For instance, facilitating charging sessions in a flexible manner can be implemented as described in U.S. patent application Ser. No. 16/983,175 filed on Aug. 3, 2020, as incorporated by reference above.

2.5.1 Fleet Charging Management

Variations of scheduling and facilitating charging sessions can be adapted for load management improvements, in a manner that reduces overall costs (e.g., costs associated with demand charges by a utility, in relation to different prices applied at different tiers of consumption) for managers of a fleet of electric vehicles.

In one such variation, as shown in FIG. 9A, the overarching system can receive or retrieve, for each electric vehicle of a group of electric vehicles in association with respective charging sessions: an arrival state of charge (SOC), an arrival time, a needed departure SOC, an actual departure SOC, and a departure time (e.g., actual departure time, intended departure time) S91. The overarching system can then categorize individual electric vehicles of the group of electric vehicles as belonging to a first subgroup having a first charging need (e.g., requiring charging), a second subgroup having a second charging need (e.g., requiring a small amount of charging), and a third subgroup having a third charging need (e.g., not requiring charging) upon determining a charging power needed by each vehicle in relation to a dwell time for each vehicle S92. The overarching system can then coordinate distribution of the group of electric vehicles across a set of EVSEs based upon at least one of power output capabilities of the set of EVSEs and availability of each of the set of EVSEs S93.

Retrieving arrival SOC and/or actual departure SOC information in Block S91 can include retrieving SOC data for each vehicle through vehicle integration or vehicle-to-grid communication interfaces (e.g., such as interfaces associated with ISO 15118 or another standard). Additionally or alternatively, the arrival SOC and/or actual departure SOC can be provided by a fleet manager, group manager, and/or other associated entity (e.g., through a management application supporting vehicle integration specifically for the fleet or group, through a management application providing API access to the overarching system, etc.). The needed departure SOC information can be retrieved by the overarching system by a fleet manager, group manager, and/or other associated entity (e.g., through manual input, through guidance based upon desire-able SOC values for maintaining and/or improving battery health, etc.). However, SOC values for each of the set of electric vehicles can be obtained in another suitable manner.

Categorizing individual electric vehicles of the group of electric vehicles in Block S92 can include determining the charging power (e.g., minimum charging power, average charging power, etc.) needed for each vehicle based upon dwell time and state of charge values for each of the set of vehicles. In one variation, charging power (P) can be determined based upon a relationship between arrival and departure states of charge and dwell time for each vehicle, where, in one example, $P=(SOC_{departure}-SOC_{arrival})/(time_{departure}-time_{arrival})$, where departure-related values are anticipated or intended departure values. However, other suitable relationships can be used to evaluate charging power needed for each electric vehicle.

In variations, the first subgroup having a first charging need can include electric vehicles for which the amount of charge needed is large relative to dwell time, such that the first subgroup includes vehicles needing charge. In variations, the second subgroup having a second charging need can include electric vehicles for which the amount of charge needed is small relative to dwell time (e.g., $P<1$ kW, etc.), such that the second subgroup includes vehicles not explicitly needing charge, or requesting a rate of charge smaller than a lower range of output power provided by one or more of the set of EVSEs. In variations, the third subgroup having a third charging need can include electric vehicles for which the amount of charge needed is small relative to dwell time (e.g., arrival SOC≥needed departure SOC), such that the third subgroup includes vehicles not needing charge. As such, the second subgroup can be categorized as filler vehicles, and the third subgroup can be categorized as optional vehicles. While subgroups of charging requirements are described, Block S92 can alternatively include determining a distribution of charging needs based upon charging power needed and dwell time for each electric vehicle, without categorization of the electric vehicles into discrete subgroups.

Figure 9B:
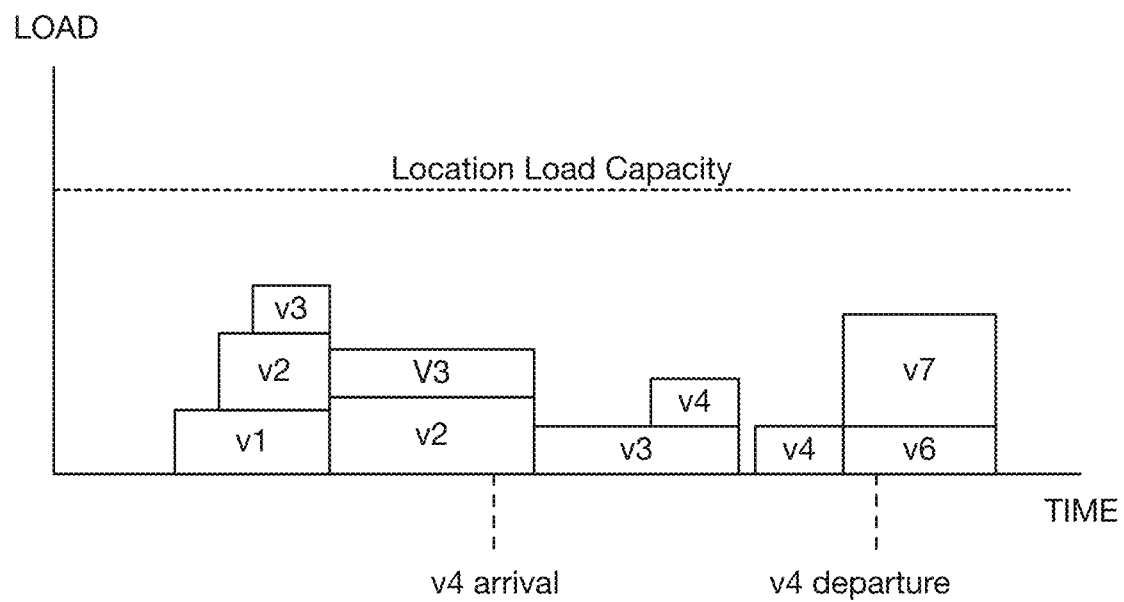

An example of distribution of the group of electric vehicles across the set of EVSEs according to Block S93 is shown in FIG. 9B, where each electric vehicle of the group/fleet is categorized and tagged with a location identifier (e.g., of a particular EVSE at a site), arrival time, arrival SOC, departure time, needed departure SOC, and actual departure SOC (e.g., v1(location_id, arrival_time, arrival_soc, departure_time, departure_needed_soc, departure_actual_soc), v2( . . . ), vn( . . . )). In one variation of distribution of the group of electric vehicles across the set of EVSEs, Block S93 can include prioritizing use of the lowest powered charger suitable for each electric vehicle, such that the set of electric vehicles is distributed across the set of EVSEs according to minimum output power associated with each of the set of EVSEs. With more granularity, in a specific example, if P for v1 is 3 kW, and a first EVSE is a level 2 charger at 7.4 kW and a second EVSE is a DCFC at 25 kW, the method coordinates charging of v1 at the level 2 EVSE, which is suitable for the charging needs of v1. As such, the 25 kW DCFC EVSE is reserved for other electric vehicles of the group/fleet having with larger charging needs or dynamic events.

FIG. 9B depicts an arrangement of vehicles (v1 through v7) across axis constraints of load and time, respectively, for a set of EVSEs at a site, where the EVSEs individually have different output power capabilities, and where the set of EVSEs collectively has a limiting load capacity. Vehicles v1, v2, v3, v6, and v7 are distributed across the set of EVSEs, where the heights of blocks corresponding to the vehicles indicates load required (e.g., based upon power calculations determined from states of charge and dwell time, as described above). As shown in FIG. 9B, vehicles v1, v2, v3, v6, and v7 can be distributed across EVSEs based upon power needs compared to output power limitations of the EVSEs. Then, in relation to vehicle v4, which has a P value less than a threshold value (e.g., 1 kW) and a specified arrival time and a specified departure time, v4 can serve as a filler vehicle and occupy EVSE sites in a manner that does not conflict with charging requirements of the other vehicles needing charge. In relation to FIG. 9B, the method can guide charging of v4 as a filler vehicle, according to logic, the logic is configured to identify a minimum in the dwell time of a filler vehicle, and then fill a suitable time window at an EVSE until the vehicle no longer has the minimum dwell time. Then, if the filler vehicle still requires charging (but below a threshold level), then the logic can be implemented again for the same or a different available EVSE. Filler logic can, however, be implemented in another suitable manner.

FIG. 9B depicts an example whereby the number of vehicles of a group/fleet is less than or equal to the number of EVSEs at one or more charging sites, such that there are no conflicts arising due to a limited number of EVSEs. However, variations of the example shown in FIG. 9B can cover scenarios whereby the number of vehicles of a group/fleet is greater than the number of EVSEs at one or more charging sites. For instance, in such variations, the method can include prioritization of vehicles according to a ranking of charging needs, and guiding positioning of the vehicles at the EVSEs based upon the ranking, with lower priority vehicles positioned into a charging queue. Then, with satisfaction of a charging parameter (e.g., SOC-derived parameter) for the vehicles initially with higher priority, the method can include moving (e.g., by an operator, by an autonomous driving/parking subsystem) one or more vehicles satisfying their charging parameter from its corresponding EVSE such that a lower priority vehicle can now charge at the EVSE. However, variations of the method can be implemented in another suitable manner.

Variations of the method shown in FIGS. 9A and 9B, can further apply to other groups of electric vehicles (e.g., non-fleet groups). Furthermore, the method can be implemented with a subset of the group of features comprising: an arrival state of charge (SOC), an arrival time, a needed departure SOC, an actual departure SOC, and a departure time. Additionally or alternatively, the method can be implemented with additional features beyond that described above.

2.6 Disconnected/Offline Operation Modes

In embodiments, EVSEs can be operated in one or more disconnected/offline modes (e.g., when there are connectivity issues between the EVSE and a corresponding cloud-based reservation calendar; etc.). Furthermore, in relation to embodiments, variations, and examples described, the disconnected/offline modes can be implemented for scenarios in which neither the EVSE(s) nor devices of user need any type of connectivity. As such, the method(s) can be implemented without relying upon connectivity of user devices to function properly.

A disconnected mode can be implemented based on one or more disconnected mode parameters associated with an EVSE. In an example, an EVSE is operable in a disconnected mode in response to a connectivity issue (e.g., in response to not being able to establish communication between a centralized reservation system and the EVSE; in response to lack of expected updates for the calendar from the associated EVSE; etc.) between the EVSE and the single, cloud-based calendar associated with the EVSE. In specific examples, operating the EVSE in the disconnected mode can include at least one of: allowing ad hoc charging sessions (e.g., in a mode only allowing for ad hoc charging sessions and not reserved charging sessions; etc.) and/or canceling the set of reserved charging sessions (e.g., cancelling currently reserved charging sessions for the EVSE; preventing future scheduling of reserved charging sessions, such as until connectivity with the EVSE is re-established; etc.); facilitating implementation of the set of reserved charging sessions (e.g., facilitating implementation of already-scheduled reserved charging sessions; such as when the EVSE has sufficiently local compute and memory to carry out such charging sessions; etc.) and/or preventing scheduling of future reserved charging sessions; shutting down the EVSE; and/or any other suitable actions.

Figure 10A:
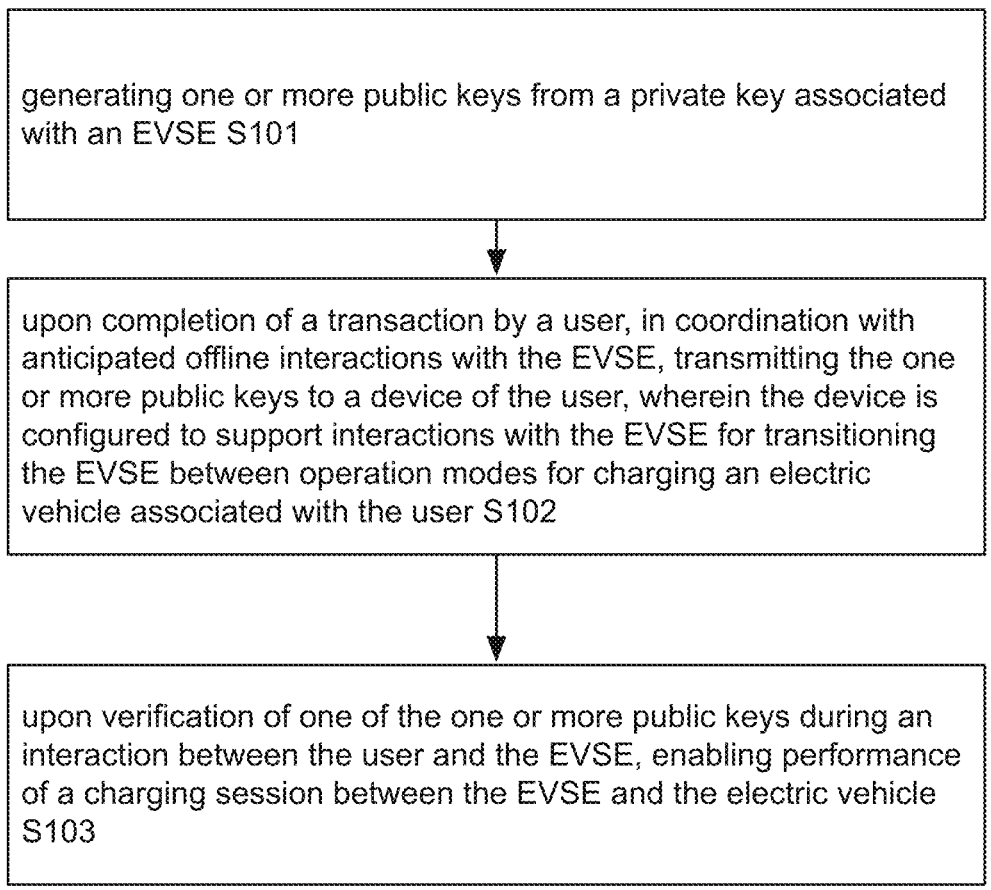
FIGS. 10A-10B depict variations of a portion of a method for providing offline access control in relation to charging of electric vehicles.
Figure 10B:
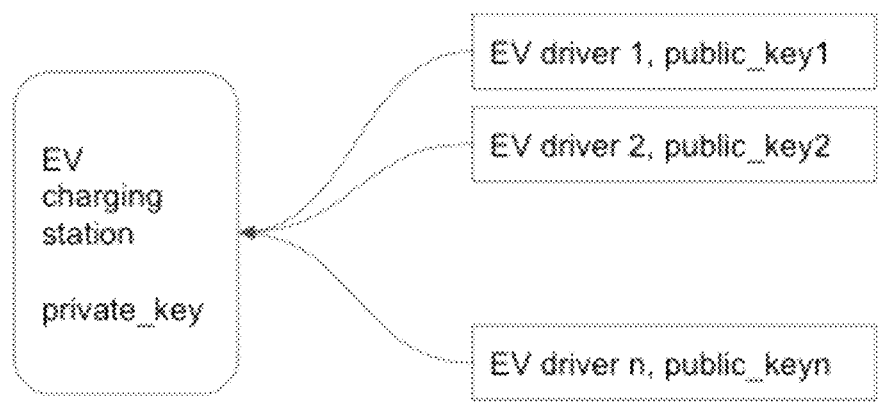

In one variation, as shown in FIGS. 10A and 10B, a method for offline access control of one or more EVSEs can implement one-way hash functions relating private and public keys for authentication (e.g., hash_f(private key) =public key). As such, one or more public keys for authentication can be generated in relation to a single private key, with security due to non-existence of a reverse function to determine private keys from public keys. The method functions to allow users to still engage with EVSEs to conduct charging sessions, even in offline/disconnected operation modes of associated devices (e.g., EVSEs, mobile devices, etc.).

One variation of the method, as shown in FIG. 10A, can include generating one or more public keys from a private key associated with an EVSE S101; upon completion of a transaction by a user, in coordination with anticipated offline interactions with the EVSE, transmitting the one or more public keys to a device of the user, wherein the device is configured to support interactions with the EVSE for transitioning the EVSE between operation modes for charging an electric vehicle associated with the user S102; and upon verification of one of the one or more public keys during an interaction between the user and the EVSE, enabling performance of a charging session between the EVSE and the electric vehicle S103.

In relation to generation of one or more public keys from a private key in Block S101, the private key can be derived from a unique identifier of the EVSE. In one example, the international mobile equipment identity (IMEI) of the EVSE or another associated internet-of-things device (e.g., device component associated with the EVSE) can form a component of the private key, where an additional string can optionally be concatenated with the IMEI of the EVSE to provide additional security. Additionally or alternatively, the private key can be derived from another unique identifier of the EVSE (e.g., serial number of a component of the EVSE). The public keys can thus be generated/related to the private key for the EVSE by a hashing function.

Alternatively, the private key can be derived from another non-static (e.g., dynamically changing) identification code associated with the EVSE, to provide additional security. In variations wherein the identification code associated with the EVSE is dynamically changing, the private and public keys can be configured to not change over a time period overlapping with an anticipated charging session of the user.

During implementation of Block S101, the EVSE hardware and an application executing at the device (e.g., mobile device of the user) can be communicatively integrated, where the logic of private key and one-way hash function is structured as part of the firmware of the EVSE. The firmware can be upgraded when an operating/management entity can physically access the EVSE, in order to enable ongoing performance of the method in a secure manner.

In relation to Block S102, completion of a transaction by a user, in coordination with anticipated offline interactions with the EVSE can include providing the user with an interface (e.g., through an application executing at the device) through which they can complete the transaction (e.g., for a charging session, for a duration of charging time, etc.). Then, the overarching system can transmit the one or more public keys to a device of the user, wherein the device is configured to support interactions with the EVSE for transitioning the EVSE between operation modes for charging an electric vehicle associated with the user. As such, EVSE access control in situations wherein offline operation is anticipated, is enabled for users who have a valid public key corresponding to the private key of the EVSE. For a site with multiple EVSEs, multiple public keys (e.g., each corresponding to different EVSEs at the site) can be transmitted to the user device through the application executing at the user device ahead of the anticipated offline charging event.

In some embodiments, the public key(s) can be displayable (e.g., within a portion or page of the application executing at the user device); however, in other embodiments, the public key(s) can alternatively be hidden or otherwise non-accessible by the user. For instance, upon completion of the transaction, the user may be provided with a graphical pass/ticket corresponding to the anticipated offline charging session, with the public key encoded in another suitable manner. In this example, the application can enforce these passes/keys and manage handling of the passes/keys (e.g., by storing the passes/keys, by deleting them once they have expired).

FIG. 10B depicts a schematic of a verification process associated with Block S103 above. In the example shown in FIG. 10B, different public keys corresponding to each user (e.g., in relation to a purchased session or duration of charging time) can be accessed (e.g., through the application executing at the device of the user). Then, the EVSE can be used to perform a verification operation by communication with the device of the user, where the verification operation can include implementing the specific one-way hash function to determine if the public key is valid. In variations, offline communication between the EVSE and the device can be performed using a suitable wired or wireless protocol (e.g., Bluetooth, Zigbee, etc.). However, verification of a valid public key of the user can be performed in another suitable manner. Once verification is complete, the charging session or duration of time purchased by the user can be executed in coordination with coupling between the EVSE and the electric vehicle, as described above.

2.7 Providing a User Interface.

Embodiments of the methods described can additionally or alternatively include providing a user interface S160, which can function to provide users with means to communicate with a reservation system and/or other suitable components, such as for submitting, viewing, tracking, modifying, and/or otherwise using reservation requests, check ins, payment, authentication, and/or other suitable processes.

Providing a user interface preferably includes providing a user interface via a mobile application for a mobile user device, but one or more user devices can additionally or alternatively be provided through any suitable applications and/or for any suitable devices.

Providing a user interface can include providing a means for viewing EVSEs and/or charging locations on a map (e.g., where reservation requests can be submitted for such EVSEs and/or charging locations; where information can be provided to the user regarding the EVSEs and/or charging locations; etc.).

In a specific example, the method 100 can include providing a user interface at a mobile application for a user device, where the user interface includes a set of charging location indicators (e.g., graphical indicators on a graphical map; any suitable indicators; etc.) associated with a set of EVSEs including the EVSE, where the reservation request is associated with a charging location indicator of the set of charging location indicators, where the charging location indicator is associated with the EVSE.

In a specific example (e.g., in relation to an ad hoc charging session; etc.), the method 100 can include providing a user interface at a mobile application for user device of a user associated with an electric vehicle, where the user interface includes: a start charging button associated with the ad hoc charging session, where the start charging button is configured to graphically indicate the eligibility for the ad hoc charging session (e.g., based on determining eligibility for the ad hoc charging session S152; etc.); and/or a reservation button for submitting a reservation request for a reserved charging session.

In a specific example, the method 300 can include providing a user interface at a mobile application for a user device, where the user interface can include one or more of a map of the route, a set of charging location indicators associated with a set of EVSEs that have been determined to provide optimum charging (e.g. based on the battery level needed, the distance traveled, driver driving efficiency, and/or other telematics data, etc.), and/or a reservation button for submitting a user reservation request for a reserved charging session, wherein the reservation button can be configured to graphically indicate optimum charging locations based on the battery level needed for the route.

However, providing one or more user interfaces S160 can be performed in any suitable manner.

2.8 Providing a Notification.

Embodiments of the methods 100, 300, and/or 400 can additionally or alternatively include providing one or more notifications S170, which can function to inform and/or guide one or more users (e.g., drivers of electric vehicles, owners of electric vehicles, and/or otherwise associated with electric vehicles; etc.), hosts (e.g., managers of EVSEs and/or charging stations; etc.), and/or any other suitable entities.

Providing notifications preferably includes providing mobile device notifications (e.g., alerts, banners, notification center notifications, lock screen notifications; etc.), but providing notifications can additionally or alternatively include providing notifications to any suitable device and/or entity through any suitable means.

Notifications can include notifications for any suitable portions of embodiments of the method 100, such as notifications for any suitable portions of a charging session (e.g., reserved charging session; ad hoc charging session; etc.). Notifications can include notifications to users and/or hosts for one or more of: reservation scheduling (e.g., notifications for successful reserving a of a reserved charging session; etc.); reservation cancellation (e.g., notifications for reservation cancellation by a host; notifications for reservation cancellation by a user; etc.); reservation approaching (e.g., notifications prior to reservation start time, where different notifications can be provided based on the amount of time until the reservation start time; notifications that can be skipped if a user has checked in for a reserved charging session; etc.); reservation start (e.g., notifications at reservation start time, where such notifications can be skipped if the user has checked in for the reserved charging session; notifications indicating that the reserved charging session will be canceled after a threshold amount of time if the user has not checked in; notifications upon check in by the user for a reserved charging session; notifications upon determining a connected EVSE to the electric vehicle and/or starting of charging, where such notifications can indicate the amount of charging to occur in the charging session; etc.); early check in (e.g., notifications to a host for indicating electric vehicle data, billing data, user data, and/or other suitable information, such as if the EVSE is available for use; notifications if the EVSE is currently unavailable and in use; etc.); charging stopped (e.g., notifications in response to a driver unplugging the EVSE earlier than the reservation end time; notifications indicating that the electric vehicle is fully charge; notifications in response to driver termination of a reserved charging session before reservation end time; etc.); reservation ending (e.g., notifications indicating an upcoming reservation end time during a reserved charging session; notifications indicating overstay penalty for staying past the reservation end time; where such notifications can be skipped if the EVSE is unplugged from the electric vehicle; etc.); reservation completed (e.g., notifications indicating completion of a reserved charging session; etc.); overstay (e.g., notifications based on the overstay penalty associated with the EVSE; notifications indicating that the user has overstayed past the reservation end time, such as notifications provided during an overstay and the EVSE is still connected to the electric vehicle; notifications encouraging the user to move their electric vehicle; etc.); overstay and upcoming reserved charging session (e.g., notifications for when a first user has overstayed past their reservation end time, and when a different reserved charging session is upcoming or being blocked by the first user; notifications encouraging the overstaying user to move their electric vehicle; notifications provided at regular time intervals; etc.); vendor coupons (e.g., notifications for coupons offered by one or more vendors; notifications to users who charged their electric vehicle or used an associated application on their user device near any EVSEs within a suitable threshold distance from a vendor offering a coupon; etc.); new charger available (e.g., notifications to users describing the new EVSE and/or associated information; etc.); events (e.g., notifications for special events such as power outages; co-marketing activities; etc.)

Notifications can include textual content (e.g., text-based communications; any suitable font size, font color, font type; other font parameters; spacing parameters; etc.); graphical content (e.g., communications including images, video, etc.); audio parameters (e.g., audio-based communications such as through music, sound notifications, a human voice; any suitable volume parameters; tone parameters; pitch parameters; etc.); touch content; and/or any other suitable type of content. Notification content can differ based on the type and/or format of the notification. In a specific example, textual content can differ between notifications for different stages and/or aspects of a charging session. In a specific example, textual content can differ between alerts and banners for the same stage and/or aspects of a charging session.

Providing notifications can be performed by a reservation system and/or by any other suitable components. Providing notifications can be performed at any suitable items relative portions of embodiments of the method 100, and/or at any suitable time and at any suitable frequency.

However, providing notifications S170 can be performed in any suitable manner.

3. Other

Embodiments of the methods 100, 300, 400 and/or system 200 can include every combination and permutation of the various system components and the various method processes, including any variants (e.g., embodiments, variations, examples, specific examples, figures, etc.), where portions of embodiments of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

Portions of embodiments of the method 100, 300 and/or system 200 can be embodied and/or implemented at least in part as a machine configured to receive a computer-readable medium storing computer-readable instructions. The instructions can be executed by computer-executable components that can be integrated with embodiments of the system 200. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to embodiments of the method 100, 300, system 200, and/or variants without departing from the scope defined in the claims. Variants described herein not meant to be restrictive. Certain features included in the drawings may be exaggerated in size, and other features may be omitted for clarity and should not be restrictive. The figures are not necessarily to scale. The absolute or relative dimensions or proportions may vary. Section titles herein are used for organizational convenience and are not meant to be restrictive. The description of any variant is not necessarily limited to any section of this specification.

We claim:

1. A method for charging of electric vehicles at Electric Vehicle Service Equipment (EVSE) units, the method comprising:
   establishing a minimum power output requirement for individual EVSEs of a total number of EVSEs associated with one or more charging sites;
   for the total number of EVSEs, enabling charging at a subset of EVSEs of the total number of EVSEs, according to a first operation mode, wherein a size of the subset of EVSEs is derived from a relationship between an overall load capacity of the total number of EVSEs and the minimum power output requirement;
   upon receiving a set of charging requests from a set of electric vehicles:
   initiating charging of the set of electric vehicles at the subset of EVSEs if a quantity of the set of electric vehicles is less than or equal to the size of the subset of EVSEs, and
   initiating charging of a first portion of the set of electric vehicles at the subset of EVSEs if the quantity of the set of electric vehicles is greater than the size of the subset of EVSEs, with placement of a second portion of the set of electric vehicles into a charging queue.

2. The method of claim 1, wherein in the first operation mode, the subset of EVSEs transmits an equal share of an available charging capacity associated with the total number of EVSEs to vehicles interfacing with the subset of EVSEs.

3. The method of claim 2, wherein the size of the subset of EVSEs is determined based upon a ratio between the available charging capacity and the minimum power output requirement.

4. The method of claim 1, wherein, upon completion of a charging sessions of a first vehicle in the first portion of the set of electric vehicles at a first EVSE of the subset of EVSEs, a second EVSE associated with a second vehicle in the charging queue is transitioned to the first operation mode.

5. The method of claim 1, wherein the minimum power output requirement is 1 kilowatt.

6. The method of claim 1, wherein in the first operation mode, the method further comprises detecting the states of charge (SOCs) of vehicles of the set of vehicles interfacing with the subset of EVSEs through a vehicle interface; and maintaining battery health and improving battery life for each vehicle of the set of vehicles interfacing with the subset of EVSEs charging each vehicle of the set of vehicles to a desired level if the SOCs are less than the desired level.

7. The method of claim 1, further comprising:
   for an EVSE of the subset of EVSEs: transforming a first digital object into a dynamic machine-readable code associated with the EVSE;
   prompting a user associated with an electric vehicle of the set of electric vehicles to scan the dynamic machine-readable code with a general-use camera application executing at a user device of the user;
   delivering a charging session interface to the user through the user device, the charging session interface including a payment interface to a payment platform; and
   upon completion of a transaction through the payment interface, initiating charging of the electrical vehicle associated with the user.

8. The method of claim 7, wherein the digital object comprises a uniform resource locator string comprising a unique identifier of the EVSE, and wherein the dynamic machine-readable code comprises a QR code.

9. The method of claim 1, further comprising associating an item with an account of a user within an electric vehicle charging platform, wherein associating the item comprises:
   prompting the user to scan a tag associated with an EVSE with a user device of the user;
   prompting the user to bring the item into communication with at least one of the user device and the EVSE within a specified duration of time, the item associated with the user and comprising an electronically-detectable identifier;
   detecting the electronically-detectable identifier from the item; and
   linking the electronically-detectable identifier within the account of the user.

10. The method of claim 9, further comprising:
    in association with an intended charging session with one of the subset of EVSEs:
    prompting the user to bring the item into communication with one of the subset of EVSEs; and
    initiating at least one of a transaction and a charging session operation mode upon detection of the electronically-detectable identifier of the item.

11. The method of claim 9, wherein the item comprises at least one of an employee badge, a housing key fob, a hotel key, a credit card, and a wearable electronic device.

12. The method of claim 1, further comprising distributing at least the first portion of the set of electric vehicles across the subset of EVSEs, wherein distributing comprises:
    retrieving, for each electric vehicle of at least the first portion of the set electric vehicles in association with respective charging sessions: an arrival state of charge (SOC), an arrival time, a needed departure SOC, an actual departure SOC, and a departure time;
    categorizing individual electric vehicles of at least the first portion of the set electric vehicles as belonging to a first subgroup having a first charging need, a second subgroup having a second charging need, and a third subgroup having a third charging need upon determining a charging power needed by each vehicle in relation to a dwell time for each vehicle; and
    distributing at least the first portion of the set electric vehicles across the subset of EVSEs based upon at least one of power output capabilities of the subset of EVSEs and availability of each of the subset of EVSEs.

13. The method of claim 12, wherein retrieving the arrival state of charge comprises implementing a vehicle-to-grid communication interface.

14. The method of claim 12, wherein determining the charging power comprises determining a relationship between a first difference between the needed departure SOC and the arrival SOC, and a second difference between the departure time and the arrival time.

15. The method of claim 12, wherein the first subgroup is characterized as requiring charging, the second subgroup is characterized requiring less than a threshold amount of charging, and the third subgroup is characterized as not requiring charging.

16. The method of claim 1, further comprising supporting an offline charging session for a user, wherein supporting the offline charging session comprises:
   generating one or more public keys from a private key associated with an EVSE;
   upon completion of a transaction by a user, in coordination with anticipated offline interactions with the EVSE, transmitting the one or more public keys to a device of the user, wherein the device is configured to support interactions with the EVSE for transitioning the EVSE between operation modes for charging an electric vehicle associated with the user; and
   upon verification of one of the one or more public keys during an interaction between the user and the EVSE, enabling performance of a charging session between the EVSE and the electric vehicle.

17. The method of claim 16, wherein the private key is derived from an international mobile equipment identity (IMEI) code of the EVSE.

18. The method of claim 16, wherein transmitting the one or more public keys to the device of the user comprises transmitting a graphical pass to an application executing at the device of the user.

19. A method for facilitating an electric vehicle charging session for a user, the method comprising:
   prompting the user to scan a tag associated with an EVSE, with a user device of the user;
   prompting the user to bring an item into communication with at least one of the user device and the EVSE within a specified duration of time, the item associated with the user and comprising an electronically-detectable identifier;
   detecting the electronically-detectable identifier from the item;
   linking the electronically-detectable identifier within an account of the user within an electric vehicle charging platform;
   in association with an intended charging session with one of a network of EVSEs:
   prompting the user to bring the item into communication with one of the network of EVSEs; and
   initiating at least one of a transaction and a charging session operation mode upon detection of the electronically-detectable identifier of the item.

20. The method of claim 19, wherein the item comprises at least one of an employee badge, a housing key fob, a hotel key, a credit card, and a wearable electronic device.

21. A method for distributing a set of electric vehicles across a set of EVSEs, wherein the method comprises:
   retrieving, for each electric vehicle of the set electric vehicles in association with respective charging sessions: an arrival state of charge (SOC), an arrival time, a needed departure SOC, an actual departure SOC, and a departure time;
   categorizing individual electric vehicles of the set electric vehicles as belonging to a first subgroup having a first charging need, a second subgroup having a second charging need, and a third subgroup having a third charging need upon determining a charging power needed by each vehicle in relation to a dwell time for each vehicle; and
   distributing the set electric vehicles across the set of EVSEs based upon at least one of power output capabilities of the set of EVSEs and availability of each of the set of EVSEs.

* * * * *